US009802579B2

(12) United States Patent
Anderson

(10) Patent No.: US 9,802,579 B2
(45) Date of Patent: Oct. 31, 2017

(54) VEHICLE WASH SYSTEM

(71) Applicant: Peter J. Anderson, Raleigh, NC (US)

(72) Inventor: Peter J. Anderson, Raleigh, NC (US)

(*) Notice: Subject to any disclaimer, the term of this patent is extended or adjusted under 35 U.S.C. 154(b) by 751 days.

(21) Appl. No.: 14/180,478

(22) Filed: Feb. 14, 2014

(65) Prior Publication Data

US 2014/0224279 A1 Aug. 14, 2014

Related U.S. Application Data

(60) Provisional application No. 61/764,618, filed on Feb. 14, 2013.

(51) Int. Cl.
*B60S 3/00* (2006.01)
*B60S 3/04* (2006.01)
*B60S 3/06* (2006.01)

(52) U.S. Cl.
CPC ............. *B60S 3/04* (2013.01); *B60S 3/002* (2013.01); *B60S 3/063* (2013.01)

(58) Field of Classification Search
CPC .......................................... B60S 3/00–3/066
See application file for complete search history.

(56) References Cited

U.S. PATENT DOCUMENTS

| | | | |
|---|---|---|---|
| 3,042,303 A | 7/1962 | Kendall | |
| 3,593,730 A | 7/1971 | Burchett | |
| 3,596,241 A | 7/1971 | Migneault | |
| 3,645,282 A | 2/1972 | Kurronen | |
| 3,650,281 A | 3/1972 | Hurst | |
| 3,921,243 A * | 11/1975 | Takeuchi | B60S 3/063 15/53.3 |
| 4,305,174 A | 12/1981 | Pyle et al. | |
| 4,453,284 A | 6/1984 | Schleeter | |
| 4,920,997 A | 5/1990 | Vetter et al. | |
| 4,933,016 A | 6/1990 | Carlson | |
| 5,033,490 A | 7/1991 | Wade et al. | |
| 5,226,436 A | 7/1993 | Kirby | |
| 5,255,695 A | 10/1993 | Downey | |
| 5,291,906 A | 3/1994 | White | |
| 5,447,574 A | 9/1995 | Inoue | |
| 5,528,234 A | 6/1996 | Mani et al. | |
| 5,749,162 A | 5/1998 | Jones | |
| 5,886,648 A | 3/1999 | McElroy et al. | |
| 6,147,625 A | 11/2000 | Decker | |
| 6,372,053 B1 | 4/2002 | Belanger et al. | |
| 6,425,407 B2 | 7/2002 | Jones et al. | |
| 6,857,438 B2 | 2/2005 | Anderson | |
| 2003/0196688 A1 * | 10/2003 | Yang | B60S 3/04 134/57 R |

(Continued)

OTHER PUBLICATIONS

FreeStyler Brochure, 4 pages (2011).

(Continued)

*Primary Examiner* — Jason Ko
*Assistant Examiner* — Spencer Bell
(74) *Attorney, Agent, or Firm* — Gardere Wynne Sewell LLP

(57) ABSTRACT

A vehicle wash system includes a track system positioned above a wash area and a movable body coupled to the track system. The movable body is movable along at least two axes and includes a gripping mechanism to selectively hold and release one or more wash tools.

18 Claims, 16 Drawing Sheets

(56) References Cited

U.S. PATENT DOCUMENTS

2005/0235521 A1* 10/2005 Dollhopf ................. B60S 3/002
                                                    34/666
2006/0236475 A1* 10/2006 Habisreitinger .......... B08B 1/00
                                                    15/53.1
2008/0060150 A1    3/2008 Dollhopf

OTHER PUBLICATIONS

ProTouch ICON Brochure, 6 pages, Date Unknown.
Laserwash 360 Brochure, 6 pages, Date Unknown.
Kondor KL1 Brochure, 2 pages (2011).

* cited by examiner

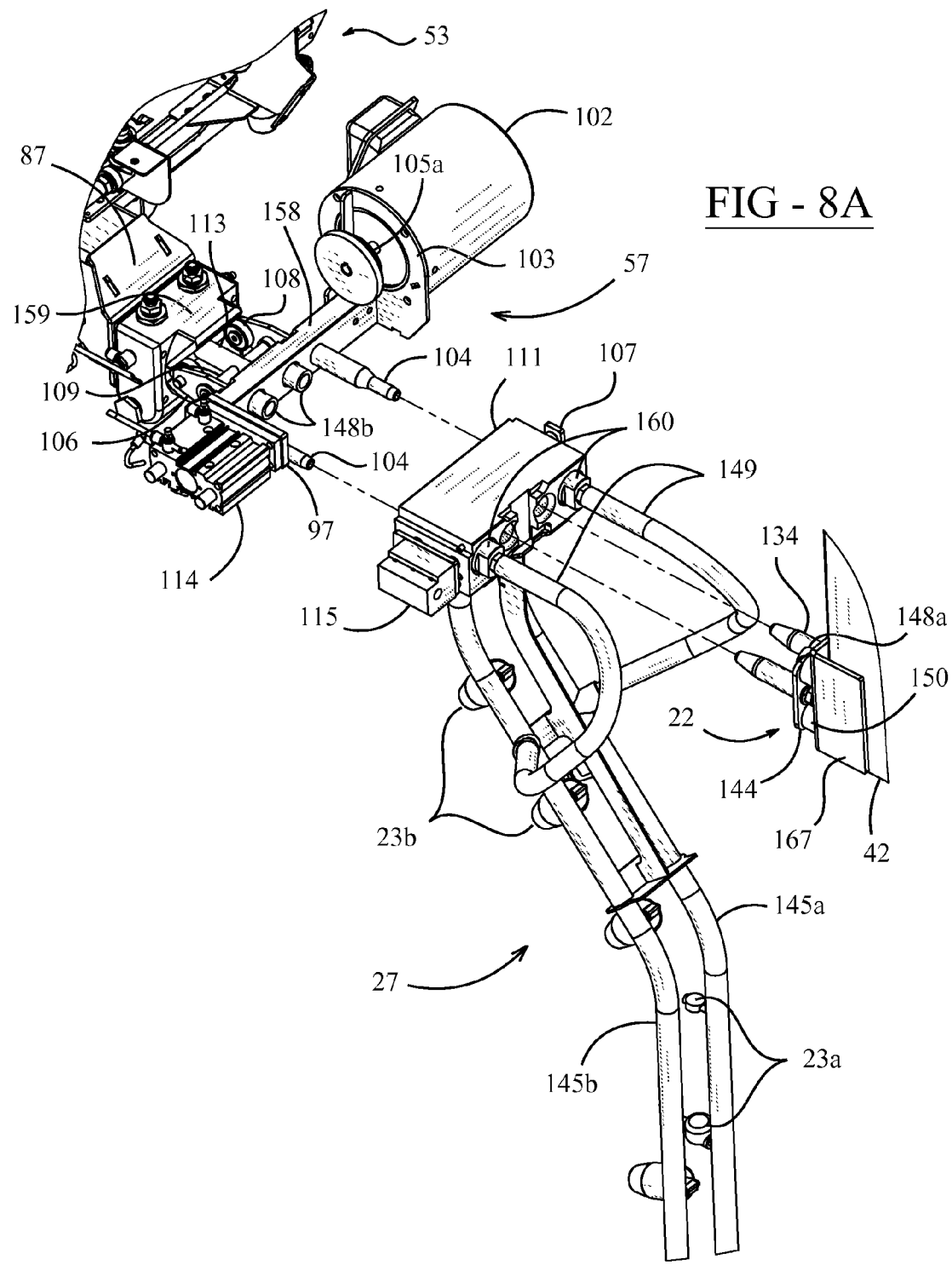

VEHICLE WASH SYSTEM

CROSS-REFERENCE TO RELATED APPLICATIONS

This application claims the benefit of U.S. Provisional Application No. 61/764,618 entitled "Robotic Vehicle Wash System," filed Feb. 14, 2013.

TECHNICAL FIELD

This disclosure relates in general to automatic carwashes, such as in-bay automatic car washes commonly called rollovers.

BACKGROUND

In-bay automatic washes are designed to wash a vehicle after it has stopped within the wash bay rather than being pulled through the bay as is the case in a tunnel wash. In-bay automatic washes are typically installed at gas station convenience stores in conjunction with self-serve wash sites, lube centers or at car dealerships. About half of these machines installed are "touch-free" so that a chemical and high pressure water spray are used to wash the vehicle without the need for workers to touch the vehicle. The other machines are friction washes that use either a bristle brush, cloth pads or closed cell foam material to wipe away dirt off the vehicle surface. There are advantages and disadvantages to each of these machines and their associated process. As such, wash customers or operators typically have a definite preference as to which process type they prefer. Many customers will not use a friction wash if they prefer touch-free, and customers that prefer a friction wash will often not use a touch-free wash. Thus, washes that employ only one of these wash techniques (i.e., only touch-free wash or only friction wash) are often limited in the number of customers that will use their washes.

SUMMARY

A highly flexible and programmable vehicle wash and dry system is described wherein, in some embodiments, an overhead wash robot or a portion of the robot may move longitudinally, laterally, and rotationally to carry out wash and dry functions to the vehicle. In some embodiments, the wash robot is able to contour the front, rear, and sides of a vehicle to be washed by longitudinal, lateral, and rotational motion commonly referred to X, Y, and Z, or "theta," motion. The robot may have grippers, commonly referred to as effectors, for attaching washing tools such as brushes, rinse manifolds, sprayers, dryers, etc. In some embodiments, one effector may be located for vehicle top washing tools and the other for side washing tools. These grippers may be stored in respective docking stations out of the wash area until the controller determines a particular attachment is required for the next wash cycle or portion of a wash cycle. The robot, or a portion of the robot, may then move to the docking stations and attach the required wash attachments to carry out the appropriate wash functions with the corresponding wash attachments.

A vehicle washing system is described that includes a washing bay for accommodating a vehicle to be washed and an overhead track system that may include a transversely spanning bridge supported on and guided by the track system for longitudinal reciprocal forward and backward movement over the wash bay. This forward and backward movement may be along an x-axis and a y-axis. In some embodiments, a servomotor is mounted on the bridge and/or track system with timing belts such that the servo motor selectively propels the unit forward and backward along the overhead track the length of the vehicle for y-axis travel. The bridge may have a shuttle unit mounted thereon that is adapted for lateral reciprocal motion thereupon over the width of the vehicle along the x-axis. A second servomotor with a timing belt may be mounted on the shuttle and may selectively propel the shuttle laterally overhead the vehicle for the x-axis. The shuttle may have several load bearing guiding idler wheels to engage the bridge guiding surfaces. The shuttle may support, and may be rotationally coupled to, a vertical bearing shaft through the center by which a frame, or theta body, hangs thereunder. In some embodiments, a third servomotor is mounted onto the shuttle and rotates the theta body about a third, vertical axis for "theta" motion. A side effector may be located at one end of the theta body and an upper effector may be located on the upper back of the theta body. The theta body may include other effectors on other portions of the theta body and the system may include other effectors on other portions of the system. In some embodiments, due to the fact that the theta body is relatively wide and attaches the wash tools to effectors on one of the distal ends, the theta body may have increased reaching capability relative to the overall size of the system. Even though the length of travel of the theta body in the lateral direction on the bridge may be shorter than the total width of the car washing system, side wash tools can be coupled to the support frame perimeter to extend the reach of the theta body. The wash robot may also have a sensor to pick up the vehicle contours, such as, for example, the front, back and side edges of the vehicle. The robot may include drying blower motors and fans for precise drying control during a dry cycle. The drying blower motors and fans may be located on and movable with the theta body or may be located elsewhere on the robot.

The aforementioned robot effectors may have pickup alignment or stab shafts to guide the robot into the wash tools on respective docking stations and to align the robot with respect to the wash tools. Likewise, the wash tools may have tapered, hollow guide features to help locate the alignment shafts. Pneumatic actuators located within the guide features or otherwise associated with the guide features may help lock the robot to the wash tools. The actuators, or other locking devices, may keep the respective wash tool locked into either the docking station or the assigned robotic effector, depending on where the system is in a particular wash cycle. Upon the event that the chosen tool is a side brush, upon engagement, a motor may be magnetically coupled to the brush for powered rotation to scrub the sides of the vehicle to be washed. The motor may be part of the theta body or may be located elsewhere on the robot or system. Upon the event that the chosen tool is a pressure washing arm, the stab shafts are locate into the tool head and are forced into sealing glands to allow for water or other fluids to be transferred to the washing arm. In this way, liquids can be transferred from a remote pumping system, through the robot, into the wash arm, and out onto the vehicle during a wash cycle. The side effector may have a built in breakaway knuckle mechanism to prevent vehicle or system damage during an impact to the side attachment. Once the obstacle is removed, the knuckle can automatically center itself back to the original position.

In some embodiments, the system support frame has four support legs mounted on the wash bay floor that extend upward toward the ceiling for supporting an overhead structure. The system support may encompass a wash area in which an automobile is located to be washed. For example, the system support may encompass an area that is slightly larger than a vehicle and the vehicle may be driven into this area prior to commencement of a wash cycle. Two cross-beam headers at each end of the system support frame are supported by two respective legs, and two structural 3d trusses spanning the length of the support frame are supported from the headers and also serve as the track for the carriage and theta body. Each of the trusses may be independently rigid in a vertical and horizontal plane to support the weight of the robot, carriage and/or theta body. Each truss also serves as structural reinforcement laterally due to the side to side motion of the robot on the frame. The driver's side truss may have two docking stations for retaining side tools, such as a side brush and a pressure wash arm, while the passenger's side truss may have one docking station for the top wash tool, such as a mitter curtain. Other configurations and locations are possible for the docking stations and any number of docking stations may be included in the system. In some embodiments, many more than three wash tools could be utilized by the system. For instance, the system may include a top wash tool that is a high pressure wash bar or a rotating top brush with some adaptations to the robot. The side tools could also include a rocker panel blaster arm or a rotary wheel scrub brush with no modification to the robot.

In some embodiments, during a touch free wash cycle, presoak soap and high pressure wash, water is fed from a remote off-board pumpstation into the robot. High pressure nozzles, preferably turbo-nozzles, may be located on a top spray bar permanently attached to the theta body or other portion of the robot, and then a separate spray bar may be incorporated into a side tool high pressure arm that can be attached to the theta body. Similarly, touch-free application soaps may be fed through a second spray bar next to the high pressure bars. The robot may apply the presoak first and then the high pressure rinse thereafter. In both instances, the robot controls the arm around the periphery of the vehicle so as to circumscribe the entire perimeter of the vehicle on each respective cycle while maintaining an optimal distance of approximately 16 inches away from the vehicle.

In some embodiments, the system is controlled by a logic controller and at least one motion controller. Servomotors may be connected to amplifiers and motion controllers to determine where the robot and/or theta body are in the wash bay with great accuracy. The servomotors may be closed loop with encoders providing positioning.

Other aspects of the system will now be generally described. In one aspect, the system has docking stations in the wash bay corners that are somewhat cloaked by the wash bay entrance wall and not readily visible to the vehicle driver. As described above, the robot may have the ability to grip and attach whatever wash attachment is desired during the wash process, whether it be a touch free arm, a set of brushes, or a mitter curtain. If a customer selects a touch free wash, the customer may not see any brushes on the robot during operation and will likely not notice the brushes in the docking stations, thereby removing concerns about a brush touching the customer's vehicle.

In another aspect, the system uses a single sensor to detect the positioning of the vehicle. This may simplify the amount of vehicle detection sensors, and thereby reduce the cost to manufacture the system and increase the reliability of the system. Additionally, the sensor may be mounted on the robot or theta body thereby giving multiple measurement points and flexibility depending on wash requirements. For example, the sensor may be mounted on the theta body so that the sensor can be moved by the theta body to different positions with respect to the vehicle. As such, a single sensor may be used to locate a front, rear and side edges of the vehicle. The robot may measure out all vehicle dimensions on an initial scan pass without any wash apparatus attached to the robot.

In another aspect, the system may include a blower unit that is movable with the theta body in an X, Y, and Theta coordinate system to provide a customized dry process to the vehicle. The dry process may be customized according to the vehicle size, shape, and position in the wash bay.

In another aspect, after the wash process and prior to the drying process, the wash robot may drop off the wash attachments. This way, wash tools such as dripping brushes are stored off the robot and away from the dry process. Additionally, without any attachments hanging below, the robot can position the dryers laterally and angularly in any position desired for optimal drying and shedding water off the vehicle.

In another aspect, the robot has three constant torque high speed permanent magnet servo motors with closed loop feedback encoding to determine the position, speed, and torque of the positioning motors. Thus, in some embodiments, the robot needs no proximity switches to determine machine positions. The servomotor motion controller detects home and end of travel positions by means of hard stops during power up and then retains all positions in memory. This can reduce proximity switch count by 5 or 6 switches increasing reliability and easing troubleshooting. The robot or a portion of the robot, such as the theta body, may travel on an X-Y coordinate in the wash bay and may rotate about a theta axis for orienting the robot into the correct position. This way the robot can operate whatever wash device in any angular position and any location within the wash area. This provides an increased capability to wash vehicles of all different shapes and sizes with much greater flexibility.

In a further aspect, there is provided a vehicle wash system that includes a track system positioned above a wash area and a movable body coupled to the track system. The movable may be movable along at least two axes and may include a gripping mechanism to selectively hold and release one or more wash tools.

In some embodiments, the movable body is rotatable about a third axis that is perpendicular to the at least two axes. In another embodiment, the movable body includes a sensor for sensing a position of an automobile in or near the wash area. In certain embodiments, the sensor is movable with the movable body to sense a forward edge of the automobile and a rear edge of an automobile. In other embodiments, the movable body includes a blower for drying an automobile in or near the wash area and a motor for powering the blower. In another embodiment, the vehicle wash system includes a first motor for moving the movable body along a first axis of the at least two axes and a second motor for moving the movable body along a second axis of the at least two axes. In yet another embodiment, the first and second motors are coupled to an encoder and the encoder is coupled to a controller for determining the position of the movable body. In still another embodiment, the first motor is controllable independently of the second motor. In some embodiments, the one or more wash tools include one or more of a wash tool to wash a side surface of a vehicle, a spray bar to spray a liquid onto the vehicle and a blower for drying the vehicle. In another embodiment, the vehicle wash system includes a docking station to hold the one or more wash tools that are not in use.

In another aspect, a vehicle wash system includes a support structure positioned over a wash area, a sensor movably coupled to the support structure, and a controller. The sensor may be positionable above a vehicle in the wash area to detect entry of the vehicle into the wash area. The controller may receive a signal from the sensor and to send a warning signal to a user interface if the signal from the sensor indicates that the vehicle has moved outside of the wash area. In certain embodiments, the vehicle wash system includes a movable body that is movably coupled to the support structure and is couplable to one or more washing tools. The sensor may be coupled to the movable body. In other embodiments, the sensor is positionable to detect a front edge, a rear edge and one or more side edges of the vehicle. In another embodiment, the sensor is directed downward.

In another aspect, a vehicle wash system includes a support structure and a movable body that is coupled to the support structure. The movable body may be movable along a first, horizontal axis and may be rotatable about a second, vertical axis. The movable body may include a powered device for facilitating a vehicle wash, such as, for example, a motor, a wash tool, an actuator or any other powered device. In certain embodiment, the powered device is an arm that is foldable to position the arm adjacent to the movable body. In other embodiments, the powered device is an arm with rotatable scrubbers.

In another aspect, there is described a method of washing an automobile. The method may include grasping a washing tool with a movable body that is movably coupled to a track system. The method may also include moving the movable body so that the washing tool washes the automobile and then placing the washing tool in a docking station. The method may include releasing the washing tool from the movable body. In some embodiments, the method includes grasping a second washing tool, moving the movable body so that the second washing tool washes the automobile, placing the second washing tool in a second docking station, and releasing the second washing tool from the moving body. In other embodiments, moving the movable body so that the washing tool washes the automobile includes washing a side surface of the automobile, moving the movable body around a perimeter of the automobile and washing an opposite side surface of the automobile. In another embodiment, moving the movable body so that the washing tool washes the automobile includes moving the movable body along a first axis, moving the movable body along a second axis and rotating the movable body about a third axis that is perpendicular to the first and second axes. In still another embodiment, the method includes sensing a position of the automobile with a sensor located on the movable body.

In another aspect, a vehicle wash system includes a track system positioned above a wash area, a movable body coupled to the track system and a sensor for sensing a location of a side surface of the vehicle. The movable body may include a blower for drying a vehicle and the movable body may be movable along an axis to position the blower adjacent to a sensed location of the side surface of the vehicle. In some embodiments, the sensor senses a location of a second side surface of the vehicle that is opposite from the first side surface. The movable body may be movable along the axis to position the blower adjacent to a sensed location of the second side surface of the vehicle.

BRIEF DESCRIPTION OF THE DRAWINGS

FIG. 8A is a cropped exploded view of one embodiment of the side effector shown in the theta body of FIG. 3 and FIG. 5. and engaging the pressure wash tool docking station of FIG. 1. Details of one embodiment of the pressure wash tool is shown as well.

DETAILED DESCRIPTION

Figure 1:
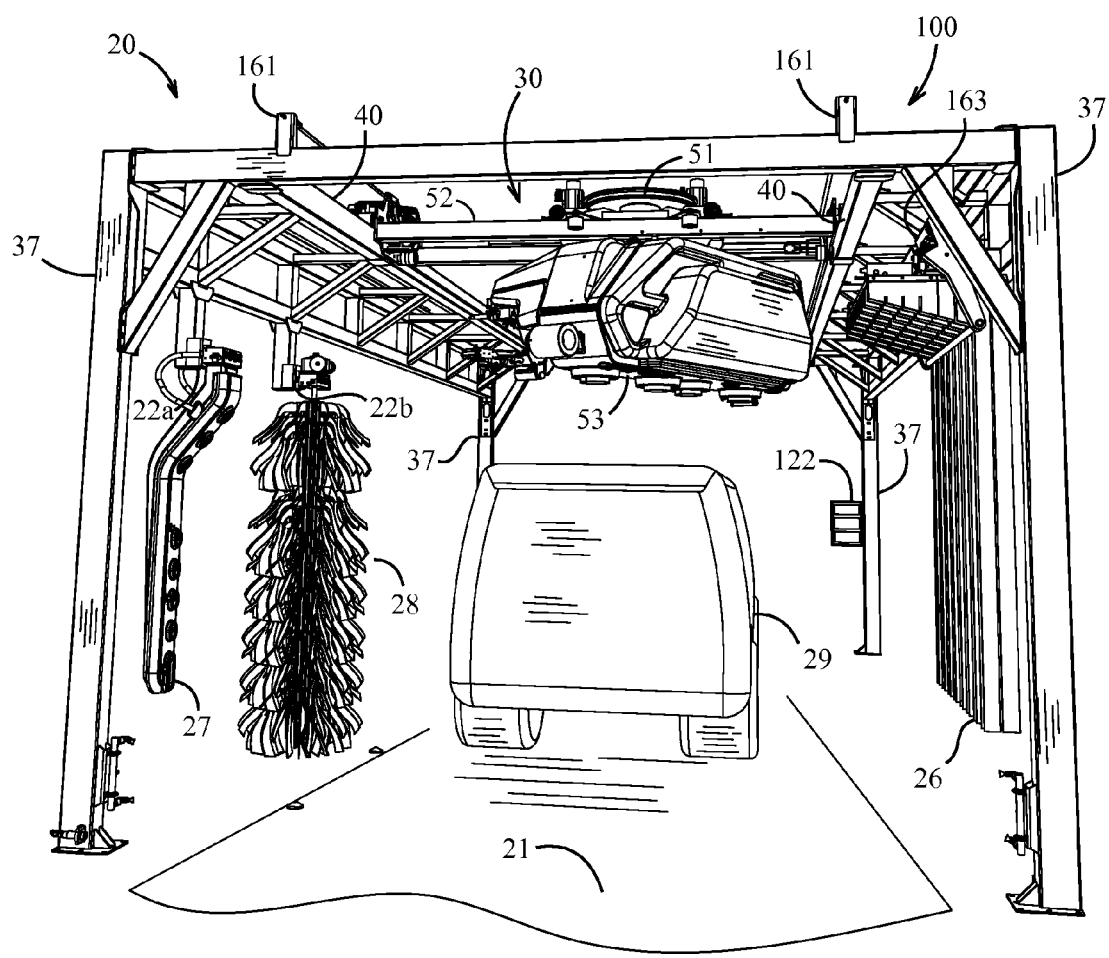
FIG. 1 is a perspective view of one embodiment of a wash system with a vehicle positioned within the wash bay.

In the description which follows like parts are marked throughout the specification and drawing with the same reference numerals respectively. The drawing figures are not necessarily to scale and certain features may be shown in generalized or schematic form in the interest of clarity and conciseness.

FIG. 1 shows one embodiment of a vehicle wash system 100 with a vehicle 29 located in the vehicle wash system 100 on a wash bay floor 21 and stopped at a nominal washing position according to the instructions of traffic light 122 located at the wash bay exit area. An elevated, generally rectangular support structural frame 20 covers the wash area in a horizontal plane, spans across and extends along the majority of the wash bay floor and is supported at each respective corner with vertical support corner stanchions 37. Two spaced apart, opposed, independent longitudinal box beams 40 are supported within the frame and extend the length of the frame 20. A vehicle wash robot is generally indicated with the reference numeral 30 and is supported on the frame 20. On each side of the wash bay area and hanging down below the frame 20 are attachable wash tools 26, 27, and 28. Each respective wash tool 26, 27 and 28 is retained within a respective docking station 22a, 22b, and 163. On the driver's side, wash tools 27 and 28 are retained in respective docking stations 22a and 22b, and on the vehicle passenger's side of the wash area wash tool 26 is retained in docking station 163. The support frame 20 has four vertical support legs or stanchions 37, each respectively supporting a corner of the frame 20.

Figures 2A, 2B:
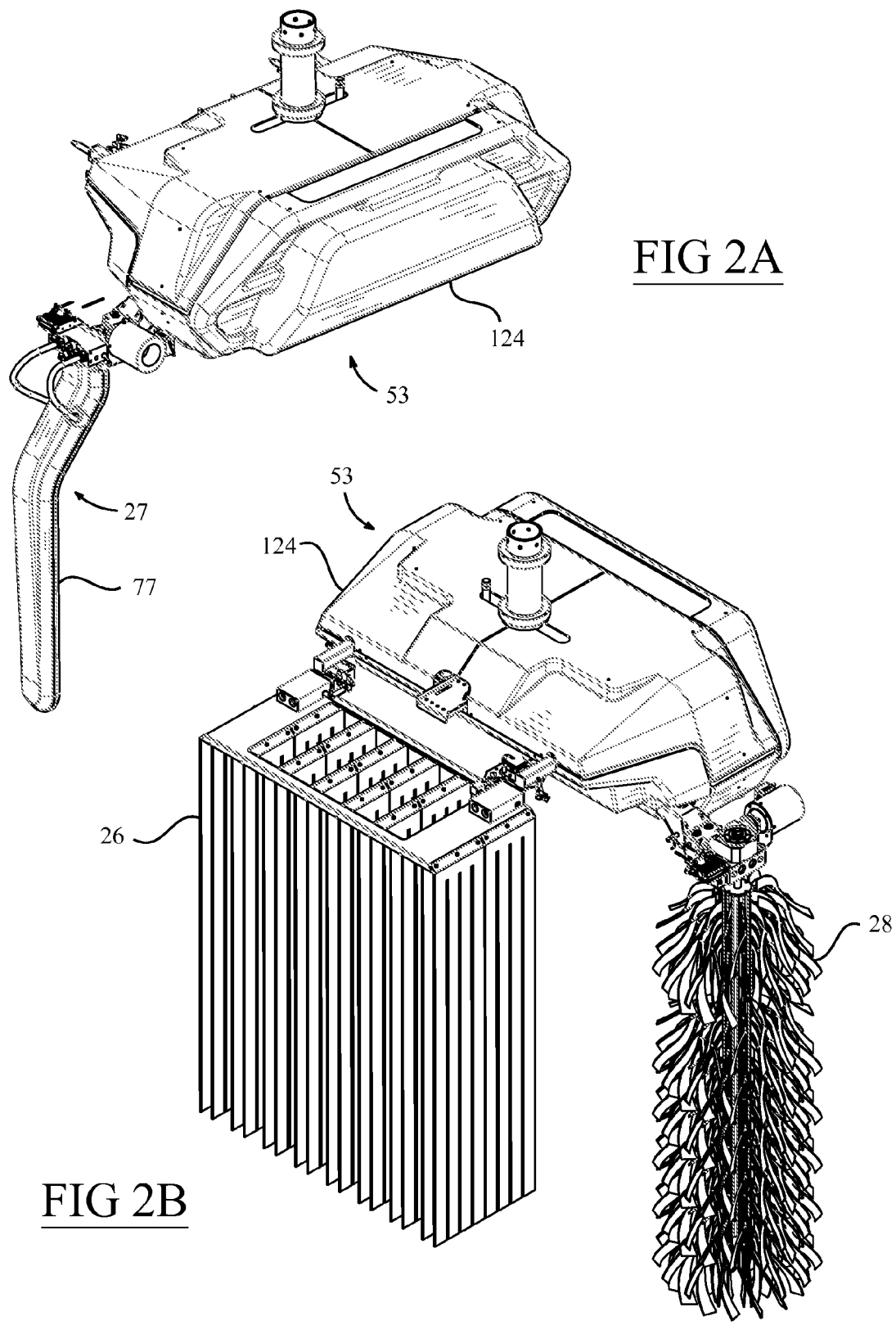
FIG. 2A is a perspective view of one embodiment of the robot theta body with the pressure wash arm tool attached and having protective covers installed.
FIG. 2B is a perspective view of one embodiment of the robot theta body with the side brush tool and mitter curtain tool attached.

Briefly referring to FIG. 2A, the theta body 53 is here shown with pressure wash attachment 27 locked into the robot theta body 53. The theta body 53 is shown with protective covers 124 shrouding the theta body 53. Likewise protective covers 77 shroud the pressure wash attachment 27.

FIG. 2B shows the theta body 53 adapted for friction washing with mitter curtain tool 26 and side brush tool 28 locked into the wash robot 30.

Figure 3:
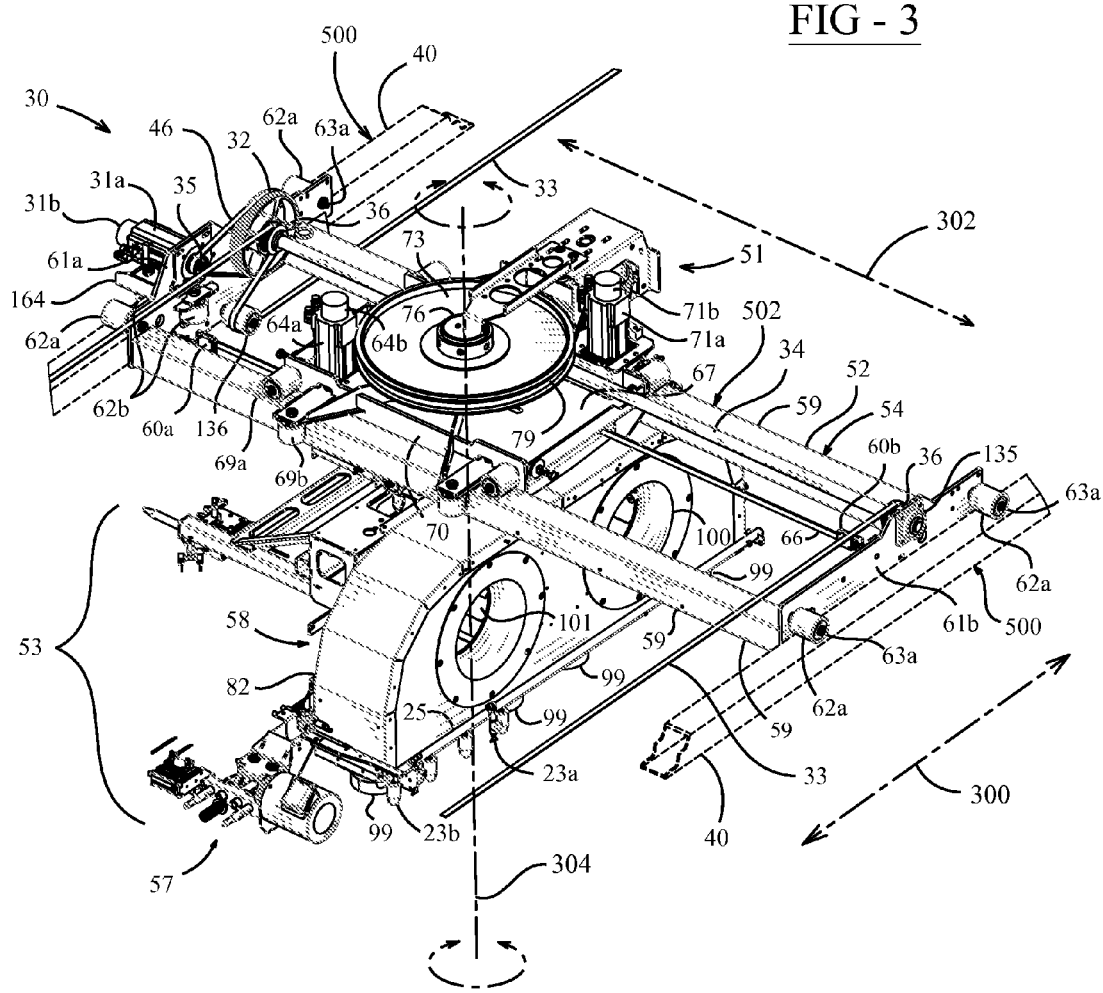
FIG. 3 is a perspective view of one embodiment of the wash robot unit showing Y axis bridge structure and the X axis shuttle frame. The theta body is also shown with protective panels removed from the theta body for clarity.

FIG. 3 is a perspective view of one embodiment of the wash robot 30 showing Y axis movement structure 500 and the X axis movement structure 502. The theta body 53 is also shown with protective panels 124 removed from the theta body 53 for clarity. Referring now to FIG. 3, the wash robot 30 has three independent stages of motion: motion in the x-axis, motion in the y-axis and rotational motion around the z-axis. The axes of motion are characterized by a moveable bridge 52 which travels along a Y axis 300 of motion, a shuttle unit 51 which travels along an x-axis 302 of motion by laterally traversing on the bridge 52 along the x-axis 302, and a theta body 53 which is supported by and rotationally coupled to the shuttle unit 51.

The bridge shuttle 52 has a simple structural frame 54 with two spaced apart parallel box beams 59 oriented perpendicular to the support beams 40 and spanning a distance between the support beams 40 over and across the wash bay area (not shown). The structural frame 54 includes an end plate 61a capping the beams on the drivers side of the frame and an end plate 61b capping the beams on the opposite end of the frame. Together, these four elements (the parallel box beams 59 and the end plates 61a and 61b) form a basic rectangular frame 54 that is movable in the y-axis along the support beams 40. Each end plate 61a and 61b has a pair of idler axes or pins 63a mounted perpendicular to the surface of the end plate 61a or 61b and having idler wheels 62a rotationally mounted for rolling along support beams 40. End plate 61a has a cutout relief wherein a channel 164 is welded in through the plate 61a in addition to the two spaced apart idler axles 63a with the guide wheels 62b rotationally mounted thereupon. The guide wheels 62a straddle and roll against drivers side support beam 40 thereby laterally constraining the bridge shuttle 52 as it rolls along the support beams 40.

Figure 6:
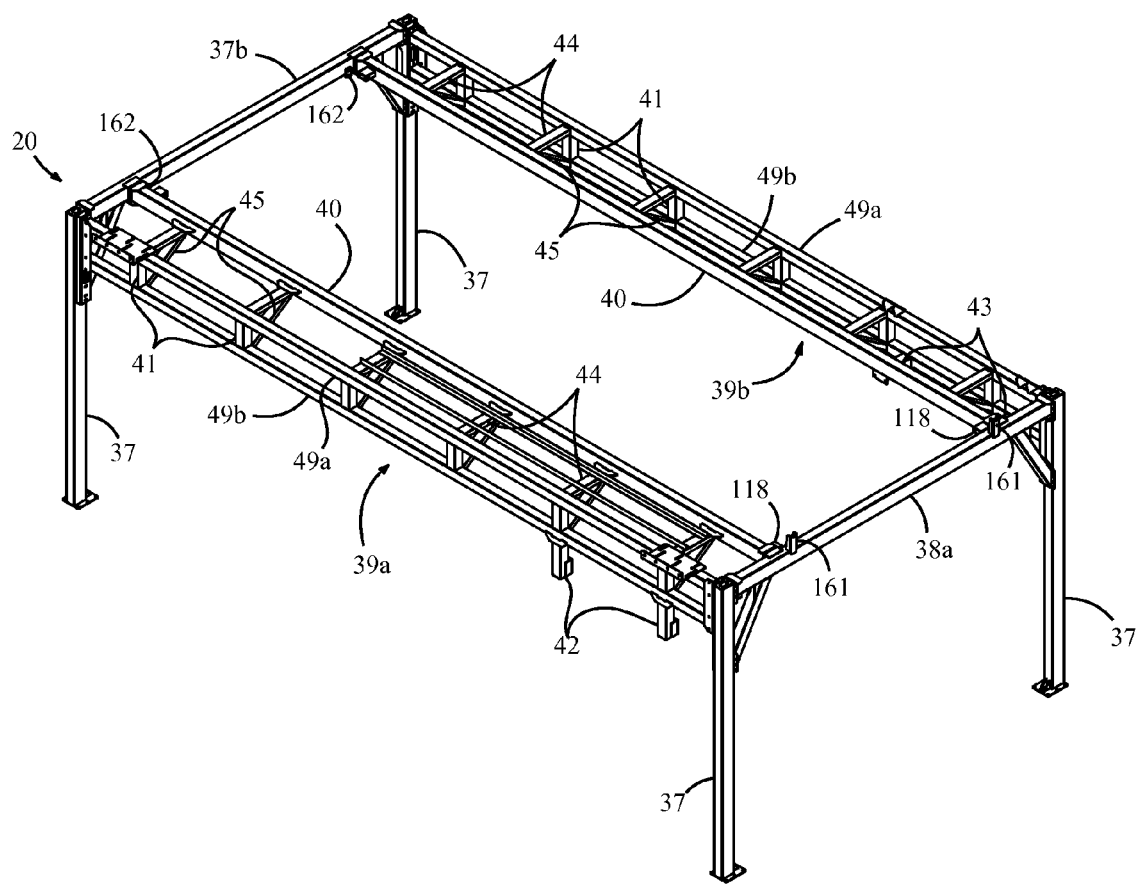
FIG. 6 is a perspective view of one embodiment of the system support frame with Y axis support beams.

Additionally, servomotor 31a is suitably mounted into endplate 61a with timing drive pulley 35 coupled to the motor drive shaft by means of a taperlock bushing. The bridge y-axis drive shaft 34 spans the bridge shuttle 52 and has supporting flange bearings 36 bolted into the endplates 61a and 61b on each end. Inboard of the drive shaft passenger's side distal end is a relatively large gearing reducer timing pulley 32 is coaxially located, and inboard of each end bearing of the drive shaft 34 is a y-axis linear timing belt pulley 36 having timing belts 33 drivingly wrapped around the belt pulleys on each end of the bridge shuttle 52. Referring to FIG. 6, the timing belts 33 (not shown) are each terminated with the support frame 20 at an entrance terminating clamp point 161 and an exit terminating clamp point 162. Referring again to FIG. 3, the timing belt idlers 136 are rotationally secured into each end plate 61a and 61b as well. Each y-axis linear timing belt 33 is routed from an entrance clamp point 161 (FIG. 6), around a timing pulley 36, back-bended around an idler pulley 136, and then terminated at an exit clamp 162 (FIG. 6) forming an elongated Z shape routing form in each y-axis timing belt 33. A timing belt 46 is drivingly coupled between the servomotor pulley 35 and the reducer timing pulley 32. In this way, each end of the bridge shuttle 52 has a linear timing belt 33 drivingly engaged with the drive shaft 34 for stable reciprocal motion along the y-axis of travel.

Figure 4A:
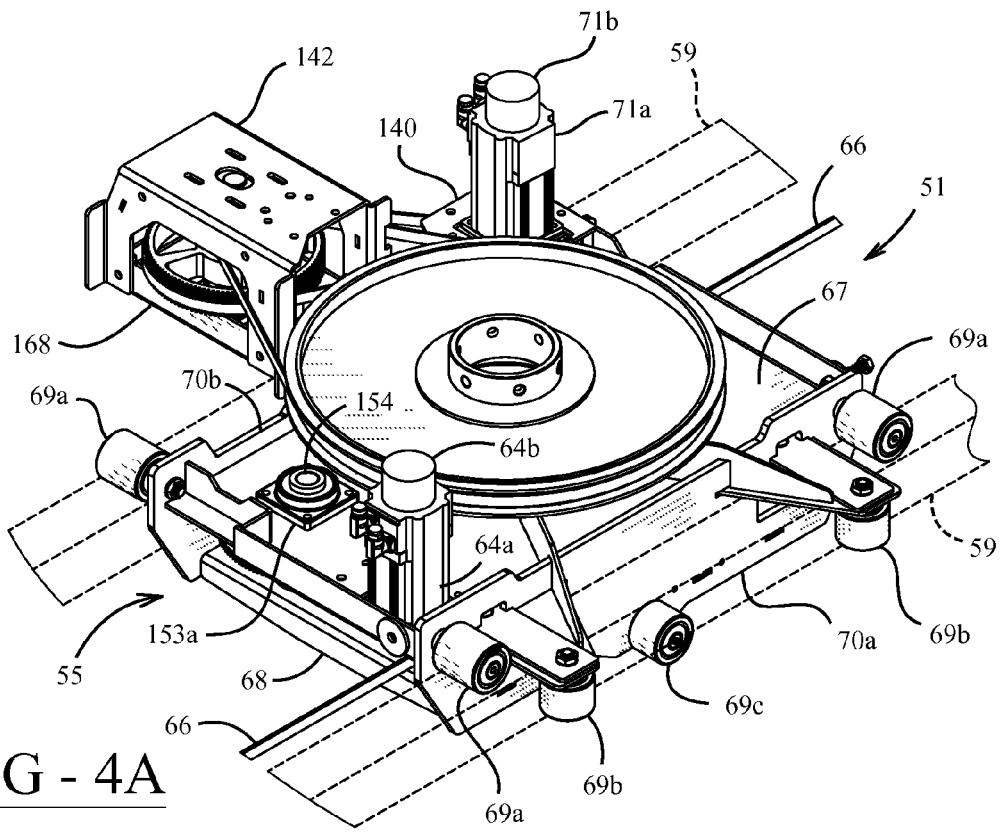
FIG. 4A is a detail perspective view of one embodiment of the X axis shuttle with Theta drive components included.

Referring to FIGS. 3 and 4A, an x-axis shuttle 51 is shown, adapted for linear reciprocal motion on the bridge beams 59 of the bridge shuttle 52. The x-axis shuttle 51 has a simple aluminum welded frame 55 with two side plates 70a and 70b connected together with a top plate 67 and a bottom plate 68 forming a generally box type construction with two open ends. Each side plate 70a and 70b has two horizontally extending idler wheels 69a to support the shuttle on beams 59 of the bridge shuttle 52 and also has a lower guide idler 69b underneath idler wheel 69a. Top plate 67 extends beyond the bridge beams 59 with four vertically oriented guiding idlers 69b constrained therein and guidingly engaging both sides of bridge beams 59.

Figure 4B:
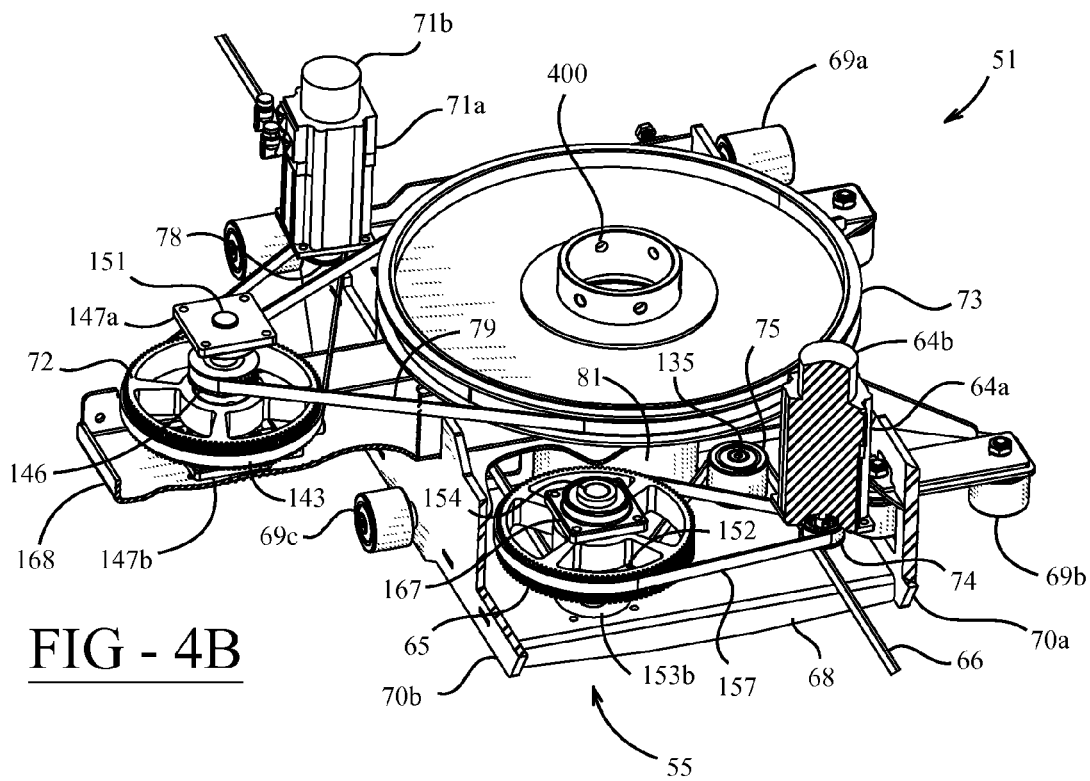
FIG. 4B is partially sectioned perspective view of one embodiment of the X axis shuttle with Theta drive components included.

Further detail on the x-axis and theta axis power transmission components of the x-axis shuttle 51 can be seen in FIGS. 3 and 4B. The x-axis shuttle servomotor 64a is bolted into top plate 67 (FIG. 4A). Similarly, the x-axis drive jack shaft 154 has flange bearings 153a and 153b on each end bolted into the top and bottom plates 67 (FIG. 4A) and 68 respectively, and driven timing gear 152 coaxially constrain thereon as well. A driver pulley 74 on the end of the servomotor 64a shaft is coupled to the timing gear 152 by means of a timing belt 157. The jack shaft 154 also has a timing belt pulley 152 coupled to it below timing gear 152. A timing idler pulley 75 is mounted to the bottom plate 68. Referring specifically to FIG. 3, on each end of the bridge shuttle 52 a suitable timing belt termination clamp 60a and 60b is located: a first clamp 60a on the driver's side and a second terminating clamp 60b on the passenger's side. An x-axis timing belt 66 is routed from the second clamp 60b, around drive pulley 152 (FIG. 4B), then backbending around idler pulley 75 (FIG. 4B), then terminating at clamp 60a, forming a generally elongated Z formation along its path.

The theta steering gear 73 of the x-axis shuttle 51 is also shown in FIG. 4B. A vertically oriented jackshaft 151 supported by a rotational bearing 147a at the top and 147b at the bottom, with the top bearing bolted into cover 124 (FIG. 2A) and the bottom bearing bolted into lower support channel 168. A timing pulley 72 is coaxially mounted onto the jackshaft 151 with a smaller driver pulley 146 mounted just above. Theta servomotor 71a is bolted onto the shuttle weldment 55 by means of support bracket 140 (FIG. 4A). Driver timing pulley 78 is mounted onto the servomotor drive shaft. A timing belt 143 is coupled between the pulley 78 and the larger timing pulley 72. Within the center shuttle frame, a relatively large, vertically oriented tube 81 is welded in as part of the frame 55, and houses theta body bearings 80a and 80b (FIG. 5) when the theta body 53 is fully assembled with the x-axis shuttle 51. The aforementioned large Theta steering pulley 73 is coupled to the driver timing gear 146 by means of a timing belt 79.

Figure 5:
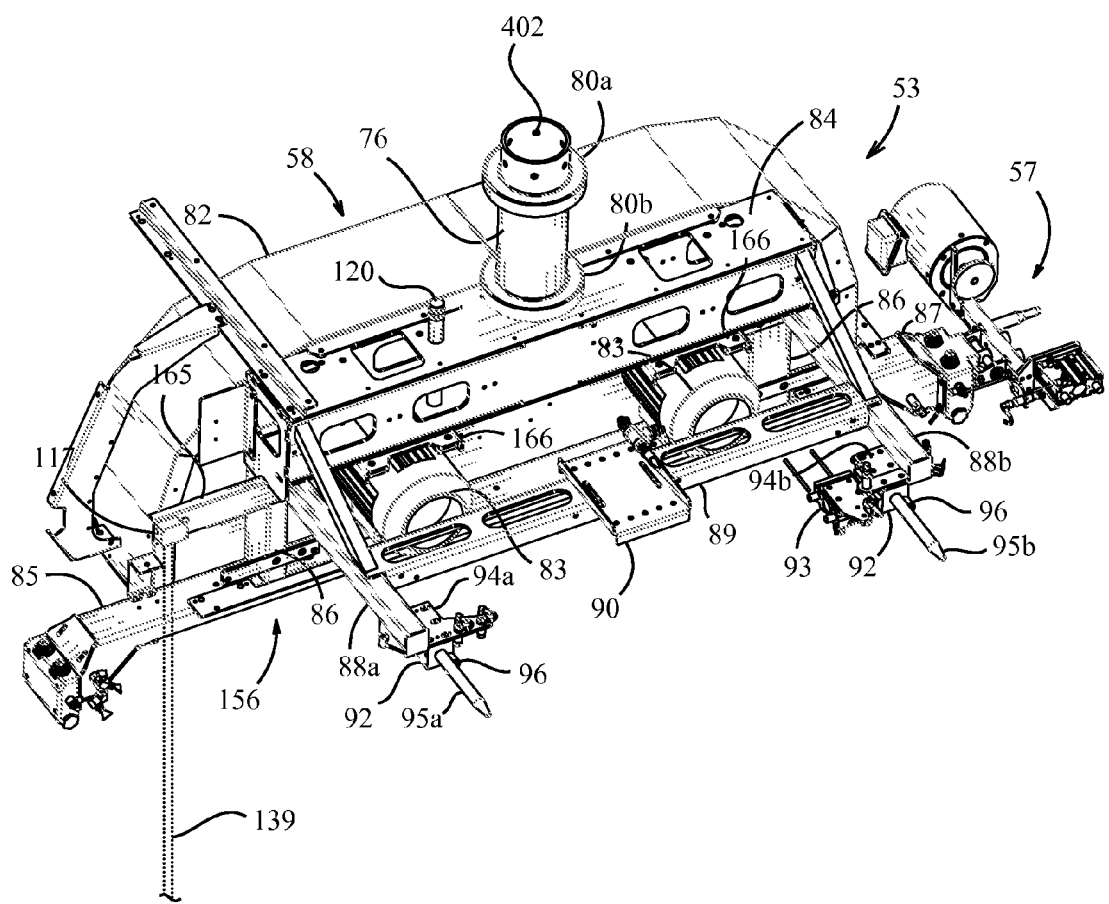
FIG. 5 is a rear detail perspective view of one embodiment of the theta body and on-board blower incorporated therein.

Briefly referring now to FIGS. 4B and 5, theta body 53 is axially secured into the x-axis shuttle 51 with a radial array of bolts (not shown) secured through bolt holes 400 in the steering gear 73 and into mounting holes 402 of the rotation tube 76 of the theta body 53. In this way, the theta body 53 is rotationally coupled to the servomotor 71a through the power transmission gearing. Vertically spaced apart support bearings 80a and 80b are fitted onto the rotation tube 76.

In FIG. 5 the theta body 53 is shown without protective panels 124. The theta body 53 has a welded aluminum frame 156 having a horizontal elongated box beam 84 with a clearance hole (not shown) into which the structural rotation tube 76 is welded. The majority of the length of the rotation tube 76 is protruding out the top face of the beam 84 thereby allowing a suitable pair of spaced apart bearings 80a and 80b to be installed over the beam 84. A connecting bar 86 is welded to the bottom side of each end of the beam 84. The connecting bars 86 extend downward to connect to a lower horizontal beam 85 thereby forming the basic frame structure of the theta body 53. Tubular standoffs 88a and 88b welded at each end of the box beam 84 extend outwardly along a horizontal plane. An auxiliary connector 89 is welded between the standoffs 88a and 88b that is parallel to and spaced apart from the box beam 84. At a distal end of the standoff 88a, a horizontal flat plate 94a is welded for securing a retaining block 92 and an effector stab shaft 95a. The effector stab shaft 95a includes a point at the distal end for engaging a mitter curtain tool 26 (FIG. 2B), as will be described in more detail below. Likewise, at the end of standoff 88b includes a horizontal flat plate 94b, a retaining block 92 and an effector stab shaft 95b.

In the center of connector 89, an adjustable plate 90 in bolted for supporting and providing strain relief to cables (not shown). At one end of the lower beam 85, an end plate 87 is welded for bolting on an effector breakaway block to support a side effector 57. Also welded to the frame is a channel 165 that holds a laser sensor 117 so that the laser beam 139 is pointed downward toward the vehicle or wash bay floor (not shown). The theta body 53 also includes a blower unit 58 that is coupled to the weldment 156. Two motor mounting plates 166 are located below box beam 84 for holding blower motors 83.

FIG. 6 provides greater detail as to the elements of the system support frame 20. Two welded structurally rigid trusses 39a and 39b provide gravitational support as well as lateral stability from the acceleration and deceleration forces generated from the dynamic movement of the wash robot 30. Both trusses 39a and 39b have a generally triangular cross sectional profile with an upper structural beam 49a and a lower structural beam 49b connected together by an array of vertical connectors 41, forming a basic rail shape. Also incorporated into the truss 39a and 39b is a travel support beam 40, which is parallel and spaced apart from the structural beams 49a and 49b. Connecting beam 40 to beam 49a is an array of horizontal members 44, and connecting lower beam 49b to beam 40 are diagonal connectors 45. Spaced apart parallel trusses 39a and 39b are connected together by means of entrance header 38a and exit header 37b forming the basic overhead frame system having four vertical support stanchions 37 to support the frame 20 above a vehicle.

Figure 7A:
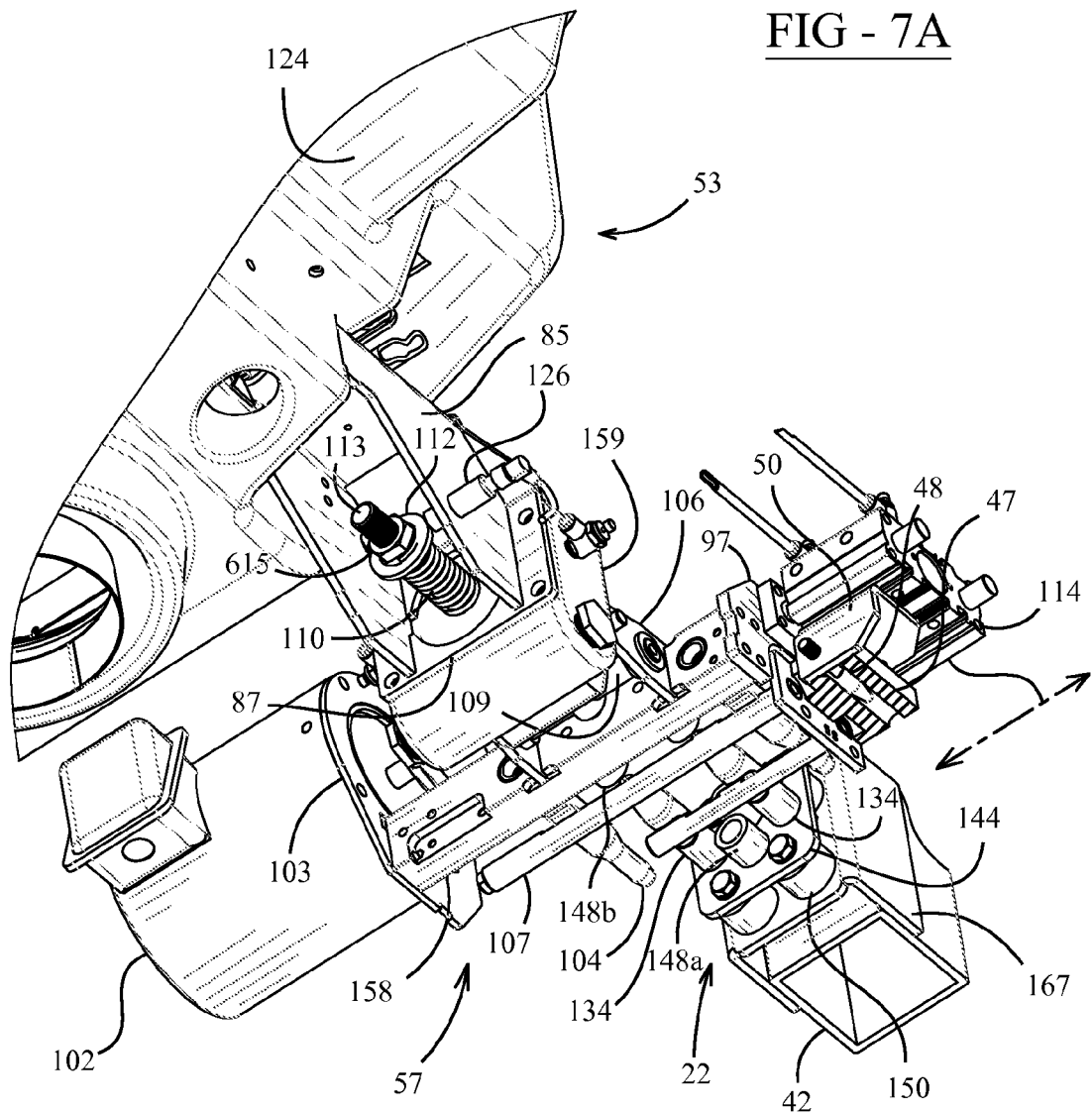
FIG. 7A is a cropped perspective view from below of one embodiment of the side effector shown in the theta body of FIG. 3 and FIG. 5 and engaging one of the side docking stations of FIG. 1. The side wash tool is hidden, while showing the lock mechanism and how it engages the side effector and docking station stab shafts during docking.

In FIG. 7A, shows the side of the theta body 53 and the side attachment effector 57 with the side tool hidden for clarity. The theta body 53 is engaged with docking station 22. The side tool docking station 22 is mounted onto the end of tubing stub 42 with a u-bracket 167. The u-bracket 167 has four alignment isolators 150, and a plate 144 bolted to the other side of the isolators. The plate 144 retains a pair of stab shafts 134 that protrude for engaging the selected side wash tool 27 or 28.

Figure 7B:
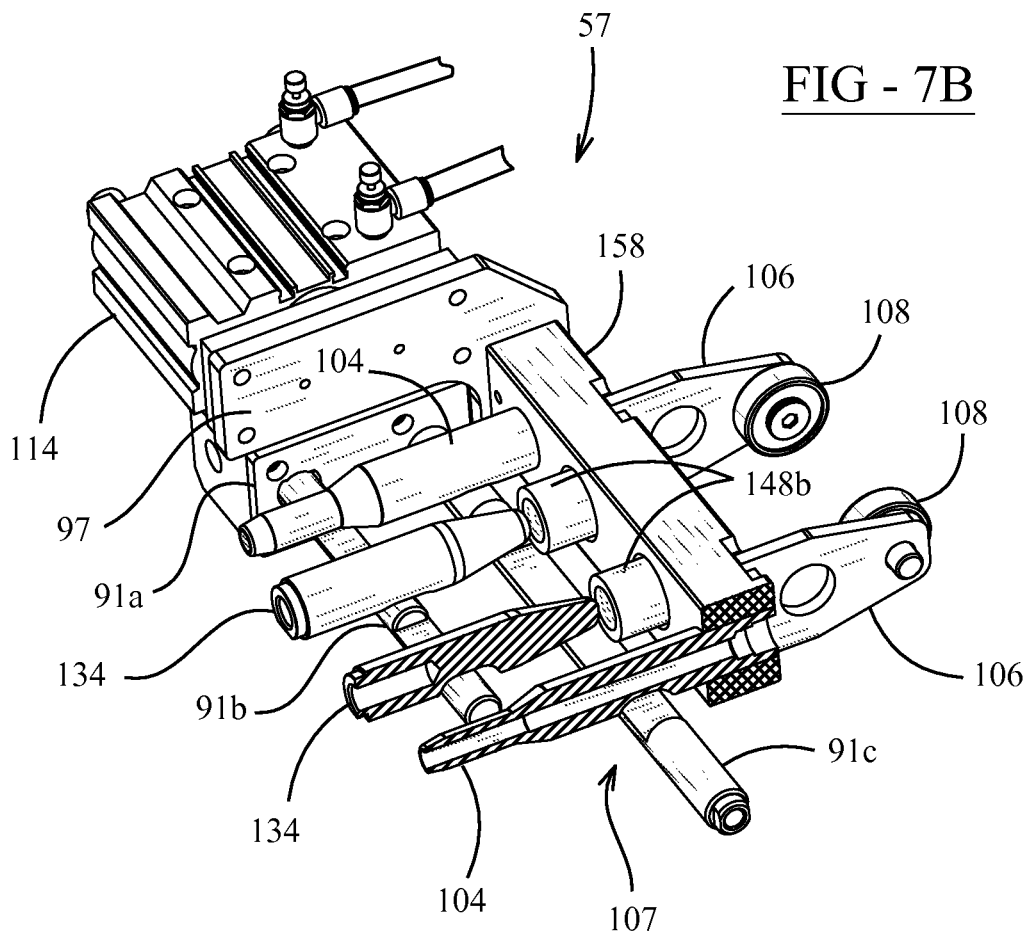
FIG. 7B is a further detailed view of one embodiment of the lock and stab shafts and illustrates the engagement between locking elements.
Figure 7C:
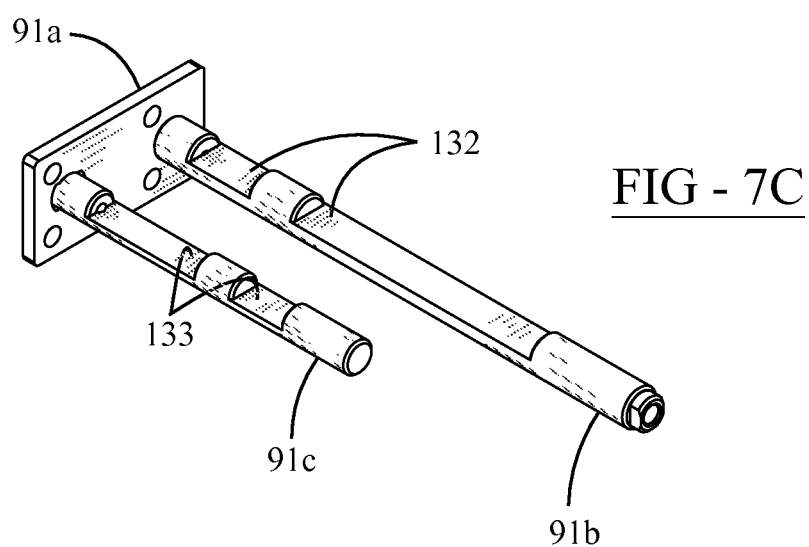
FIG. 7C is a detailed view of a one embodiment of a lock.

Referring now to the lower frame beam 85 of the theta body 53, at the end of the theta body lower frame beam 85 there is an attachment plate 87 for mounting a side effector breakaway v-block 159. FIG. 8A shows an upper view of the breakaway v-block 159. The breakaway v-block 159 has a close tolerance clearance hole (not shown) provided with an axially and radial moveable shaft 113 mounted therethrough. The outboard end of the shafts 113 has a crosspin shaft 109 welded to form a t-shaped connector for two axis of rotational controlled motion for the breakaway function of the v-block 159. Referring specifically to FIG. 7A, the shaft 113 has screw threads cut therein for tightening a hex nut 615. The hex nut 615 moves thrust washer 112, which in turn, compresses spring 110, which thereby pulls the shaft 113 and crosspin 109 to draw the side effector thrust rollers 108 (FIG. 7B) into the v-block 159 forcing alignment to the robot 30 during a normal operational condition, while allowing for two axis of breakaway motion. A closer detail of the side effector, locking pin 109, and stab shafts 104 is shown in FIG. 7B. The side effector 57 is a rigid structure with a machine block 158 to house and tightly control alignment of stab shafts 104 fitted into a side face and extending outwardly from the robot 30 to engage selected side tools 27 or 28 and are each ported to channel fluid from the robot into the pressure wash side tool 27. A pair of spaced apart plates 106 are welded on the opposite block face and facing inwardly toward the theta body 53. Each plate 106 has a roller 108 rotatably secured for engaging the v-block 158. At one end of the block 158, plate 97 is welded for bolting side tool lock pneumatic actuator 114. On the other end of block 158, a flange ring 103 (FIG. 8A) is welded to support motor 102. A pair of compression springs 148b are bolted in between the stab shafts 104 and pocketed into the block 158 for bias pressure locking side tools therein. An angle bracket 50 (FIG. 7A) is mounted on actuator 114 to hold lock shift guide pin 48, which upon side tool engagement sides into side tool lock block 47 so the actuator 114 can shift the lock for selectively locking the side tool into either the side effector, or into the docking station as required by the system. FIG. 7C shows the baseplate 91a, the effector lock pin 91b mounted on the baseplate 91a, and a docking lock pin 91c mounted on the baseplate 91a. Each lock pin 91b and 91c has respective reliefs 132 and 133 machined that serve as clearances for the respective stab shafts 104 and 134 to pass through when the appropriate side tool is slid into or pulled out of the side effector or docking station as needed. The stab shafts 104 and 134 each have respective reliefs for engaging or clearancing the respective pins 91c and 91b as needed as well.

In FIG. 8A shows the pressure wash arm side wash tool 27 aligned with the side effector 57 and the docking station 22, and shows the basic elements of the tool 27 starting with the head block 111. The head block 111 is fitted with a set of gland seals 160 to receive the effector stab shafts 104 such that a pressure seal is made and wash fluids can be transferred from a remote source through the robot 30 and into the tool 27 as required. Two pipes 145*a* and 145*b* serve as liquid dispense manifolds due to generally equally spaced out tapped holes for even distribution, and high and low pressure nozzles 23*b* and 23*a* respectively screwed into the tapped holes for dispensing wash fluids onto the vehicle. The pipes 145*a* and 145*b* have a common flange welded to them on the upper terminating end for securing to the head block 111, and flexible hoses 149 for porting the fluids out of each respective seal gland 160 to the respective pipe in fluid communication with it.

Figures 8B, 8C:
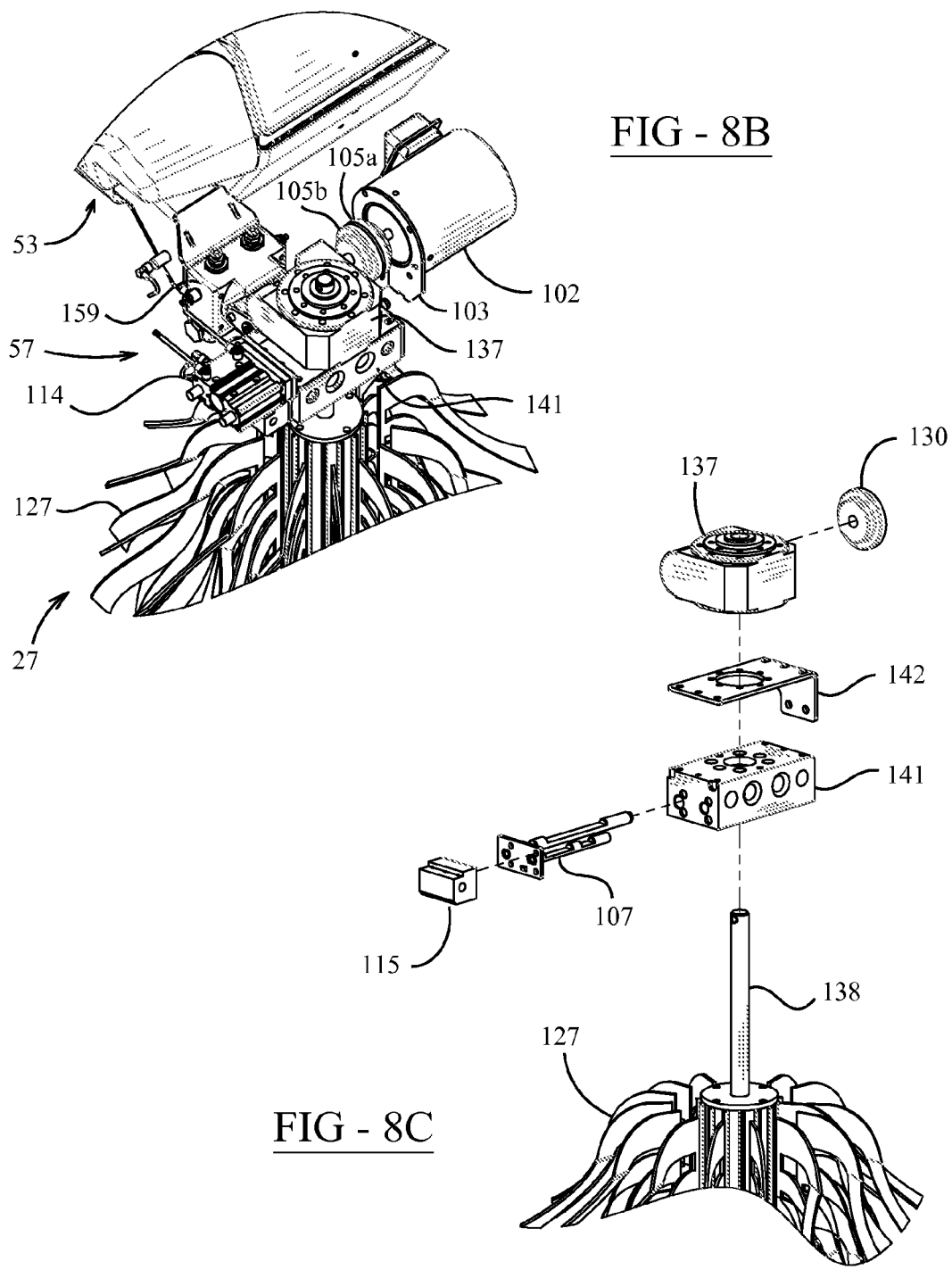
FIG. 8B is a cropped view of one embodiment of the side brush tool while locked into the side effector.
FIG. 8C is a detail exploded view one embodiment of the side brush tool.

In FIG. 8B, the side brush washing tool 27 is shown attached to the robot theta body 53 by means of the side effector 57. A head stab block 141 having close tolerance clearance holes to accept stab shafts and a clearance hole through the center top to bottom is fitted on top with an adapter plate 142 (FIG. 8C) so as to accept a hollow bore right angle worm gear style speed reducer 137 by means of bolted fasteners. The reducer 137 has an input shaft with a rare-earth magnetic coupler 105*b* affixed to it. A rotary cleaning brush 127 having a drive shaft 138 (FIG. 8C) is mounted into the speed reducer 137. A lock 107 (FIG. 8C) with a predetermined amount of axial freedom of movement is permanently retained within the head stab block 141 for selectively engaging a docking station 22 or the robot side effector 57 as required. Similarly, a rare-earth magnetic rotary power transmission coupler 105*a* is mounted onto the end of drive motor 102 such that when the side brush wash tool 28 is locked into the robot, rotational power can be transmitted from the motor 102, through magnetic couplers 105*a* and 105*b*, and into the side brush for scrubbing the vehicle.

Figure 8D:
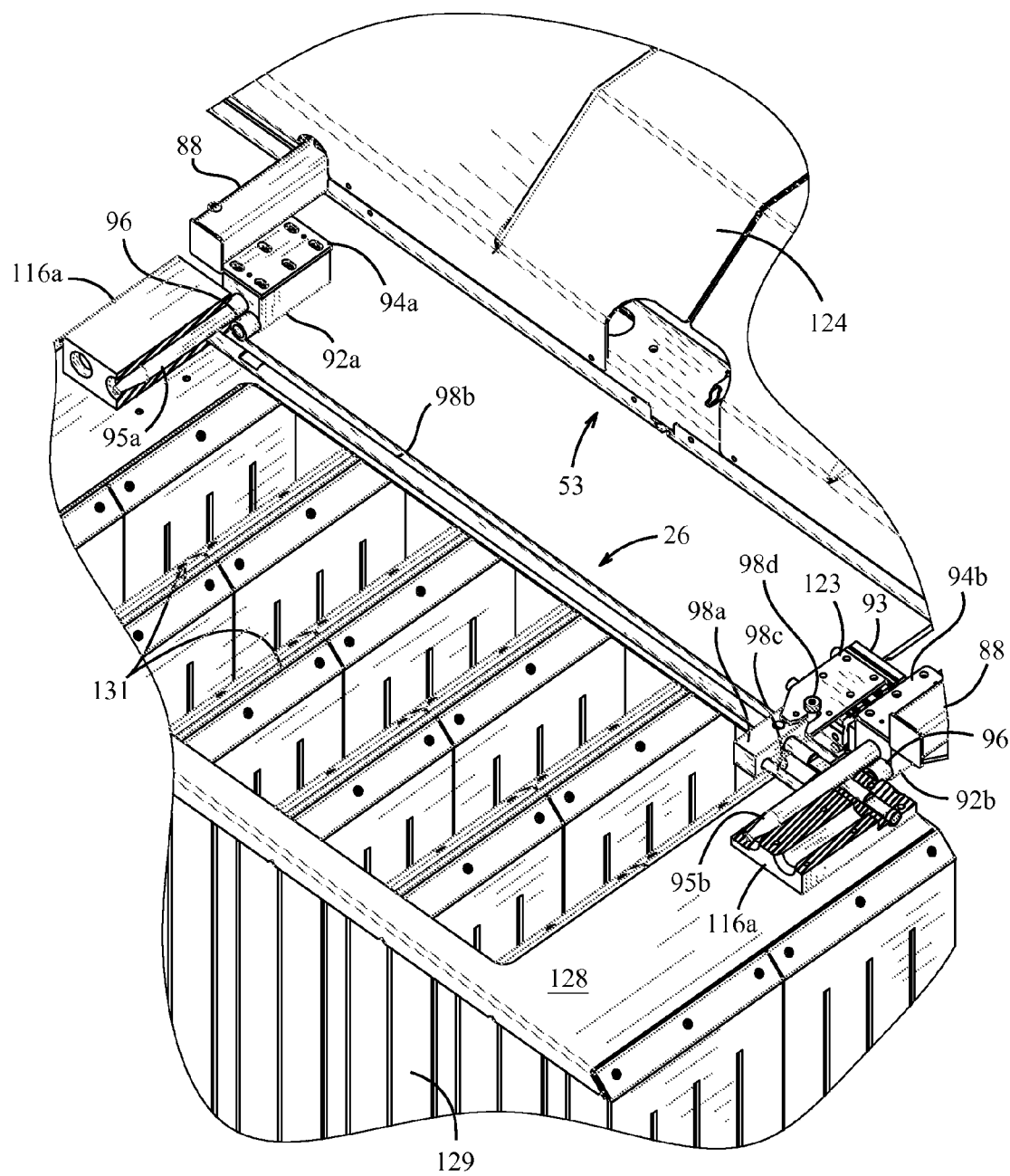
FIG. 8D is a cropped view of one embodiment of the mitter curtain tool while locked into the top effector.

Referring to FIG. 8D, the mitter curtain wash tool 26 is shown in attached to the robot theta body 53 to carry out cleaning of the vehicle top surfaces. The mitter curtain wash tool 26 has a sheetmetal frame 128 with an array of angular crossmembers 131 welded to it for strengthening the frame 128 and to secure the upper end of cloth strips 129 hanging down underneath for cleaning the vehicle top surfaces. Plastic engaging stab blocks 116*a* are bolted onto the frame 128 as a point for the theta body 53 to secure the tool 26, and to locate the wash tool 26 into a top wash tool docking station, not shown in detail. A pair of stab shafts 95*a* extending out from the theta body 53 engage and then are locked into the mitter curtain stab blocks 116*a* by means of a locking shaft 98*b* which is retained within the mitter curtain tool 26 and is actuated by pneumatic cylinder 93 to slide the locking pin to a position for locking the mitter curtain tool 26 into either the theta body 53 or into the docking station. A rectangular machined block 98*a* is welded to locking shaft 98*b* with a guide pin 98*d* protruding out of one face for linear engagement with a plate 123 mounted to the actuator 93. Another pin 98*c* is welded into the block 98*a* to keep the lock shaft 98*b* in the optimal angular orientation.

Figure 9:
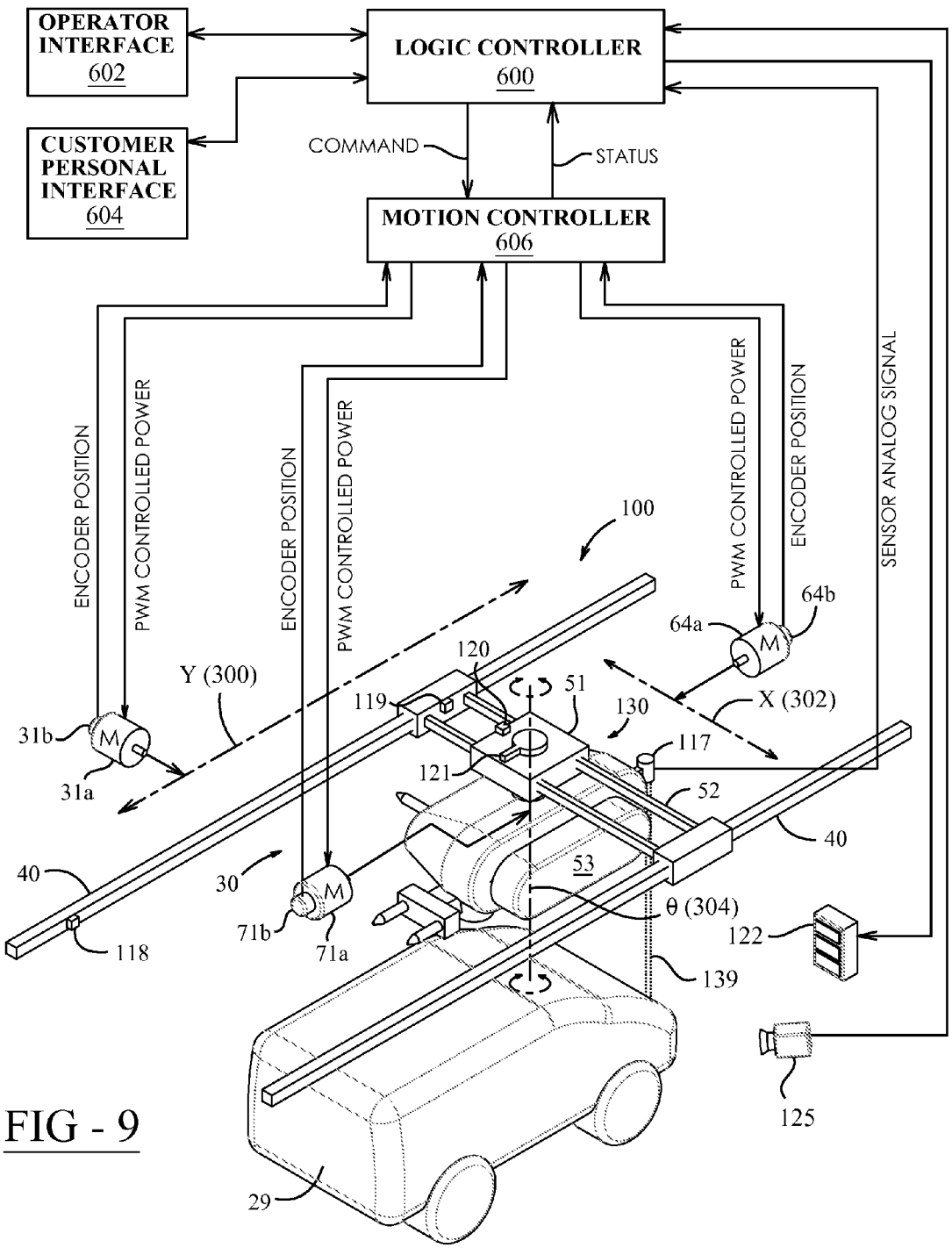
FIG. 9 is a schematic view of one embodiment of the robot motion control system.
Figure 10A:
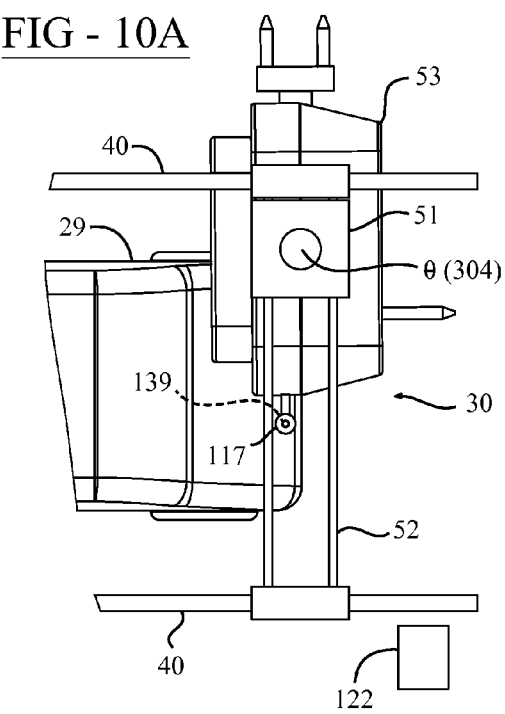
FIGS. 10A and 10B are top and side schematic illustrations of one embodiment of a vehicle driven into the wash bay and breaking the laser beam during initial vehicle position detection in the wash bay.
Figure 10C:
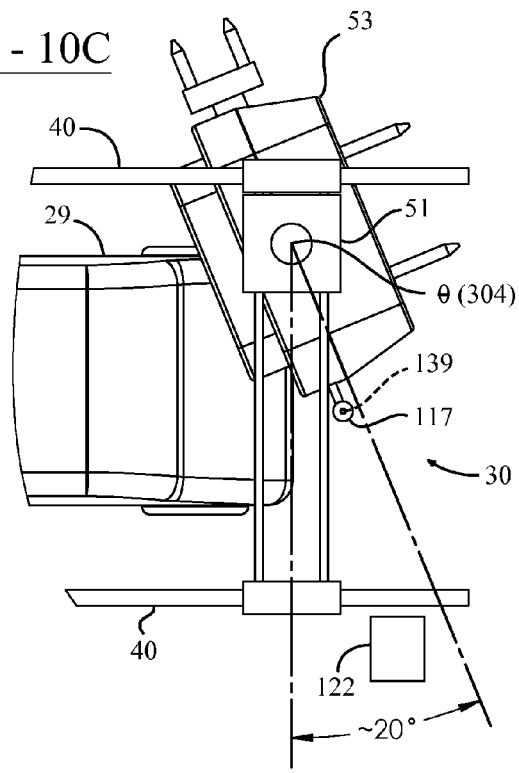
FIGS. 10C and 10D are top and side schematic illustrations of one embodiment of the robot theta body indexed with the laser beam clearing the vehicle leading edge during initial vehicle position detection in the wash bay.
Figure 10B:
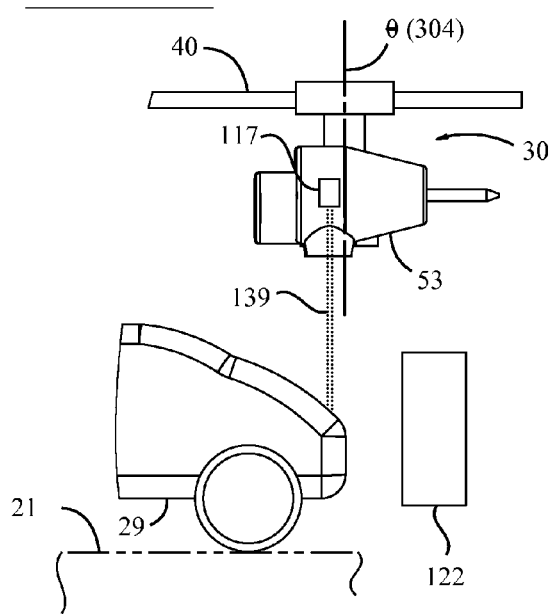
Figure 10D:
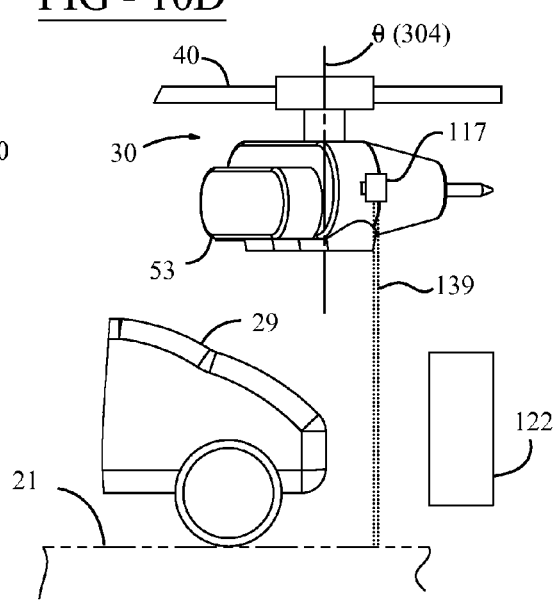

Referring to FIG. 9, one example embodiment of the operation of the wash system 100 will be described. The system 100 overall control is determined by a programmable logic controller 600. Specific wash site parameters are selected or adjusted within the controller 600 by means of an operator interface 602. Selectable parameters include, but are not limited to, wash cycle speed, sensor calibration, robot training parameters, errors, maintenance, etc. Additionally, the logic controller 600 also receives commands by way of a customer personal interface 604. The controller 600 may have an analog, digital, and discreet input/output in addition to a multi-axis motion controller utilizing software such as G-Code or an advanced form of C. The wash robot 30 is capable of three axis of motion: x-axis 302 linear motion, y-axis 300 linear motion, and theta axis 304 rotational motion (i.e., rotation about the theta axis 304). The motion controller controls three motors 64*a*, 31*a*, and 71*a* by means of an amplified three phase PWM power wave to each motor 64*a*, 31*a*, and 71*a*. The power wave provides adjustable torque, speed, and position. Likewise, the respective motors utilize encoders 64*b*, 31*b*, and 71*b* to feedback positioning to the motion controller 606. The motion controller 606 sends the motion status to the logic controller 600. Each axis 300, 302 and 304 includes a home position point established by way of engaging a hard stop 118, 119 or 120 at the end of a travel limit. The x, y and theta axes utilize respective hard stops 119, 118, and 120. Upon a maintenance event or a power failure, the logic controller 600 will signal the motion controller 606 to locate the positioning of the robot 30 by means of jogging each axis of motion 300, 302, 304 to the respective hard stop 118, 119 or 120. The system 100 rotates motors 64*a*, 31*a*, and 71*a* until each motor 64*a*, 31*a*, and 71*a* is stopped because the respective drive system encounters the dedicated hard stop 118, 119 or 120, the motion controller 606 detects that the encoder has stopped advancing, and motor amperage has spiked. From these encoder positions, the motion controller 606 can move all three robot axis 300, 302 and 304 without concern of a collision. The positioning of the robot 30 allows for proper engagement with the docking stations 22 and wash tools 27 or 28 (FIG. 13. Proper alignment into the tool 27 or 28 and docking stations 22 may prevent a crash, and proper depth engagement into the tool 27 or 28 and docking station 22 by the robot 30 allows the locks to be freed so they can be actuated into the proper position. For this reason, upon system 100 installation prior to system wash cycling, the robot 30 docking station positions are entered into the logic controller 600 and motion controller 606 and stored into non-volatile memory. This is accomplished by manually or automatically jogging the robot 30 axis of motion 300, 302 and 204 to each desired position and manually or automatically inputting the positions using the operator interface. Close tolerance timing of the mechanical drive system may be maintained without excessive backlash by means of high performance timing belting and timing pulleys.

At the beginning of a wash cycle, the system 100 may be flagged to start in two manners. The first is a commonly used cash acceptance type kiosk which sends a signal to the controller 600 to arm the system 100. A second method is to receive a signal from a mobile device such as a smart phone, mobile PC, or tablet. These mobile devices may be in communication with servers over public and private networks. The controller 600 may have a network connection to a server where the customer can set up an online account, make wash payment, or adjust the performance of the wash to the customer's preferences. At the wash bay entrance, the customer can scan a barcode into the mobile device and the controller 600 will be signalled to engage the customer through the mobile device or through audiovisual means such as an instruction sign 122. During the wash process, the customer may adjust the wash and dry cycles, and at the end of the wash cycle a camera 125 located in the wash bay area may send an image to the customer so the customer can determine if the wash is satisfactory. The wash can then re-wash with adjustments if requested.

As can be seen in FIG. 10A thru 10D, an illuminated instruction stand 122 signals the customer to drive into the wash bay while the robot 30 is staged at the wash bay exit end with the x-axis shuttle 51 biased to the driver's side of the bridge shuttle 52 and the theta body 53 indexed such that the laser sensor 117 is extended out toward the passenger's side of the bay. The laser beam 139 may be pointed downward to detect the wash bay floor 21. The vehicle 29 is driven forward until the front end breaks the laser beam 139 and laser sensor 117 signals the logic controller that the beam target distance has changed, indicating that the vehicle 29 has been detected. The instruction sign 122 changes from an "ENTER" instruction to a "STOP" instruction. After allowing a brief moment for the vehicle 29 to stop and settle, the robot indexes the theta body 53 counterclockwise from a plan view, approximately 20 degrees or 14 linear inches at the laser 139 point to verify the vehicle 29 has stopped within the specified range. If the laser sensor 117 does not detect the floor 21 again at the predetermined distance in the angular sweep, this indicated the instruction sign 122 displays "BACK UP" until the vehicle 29 is in proper position to start the wash processes.

Figure 11:
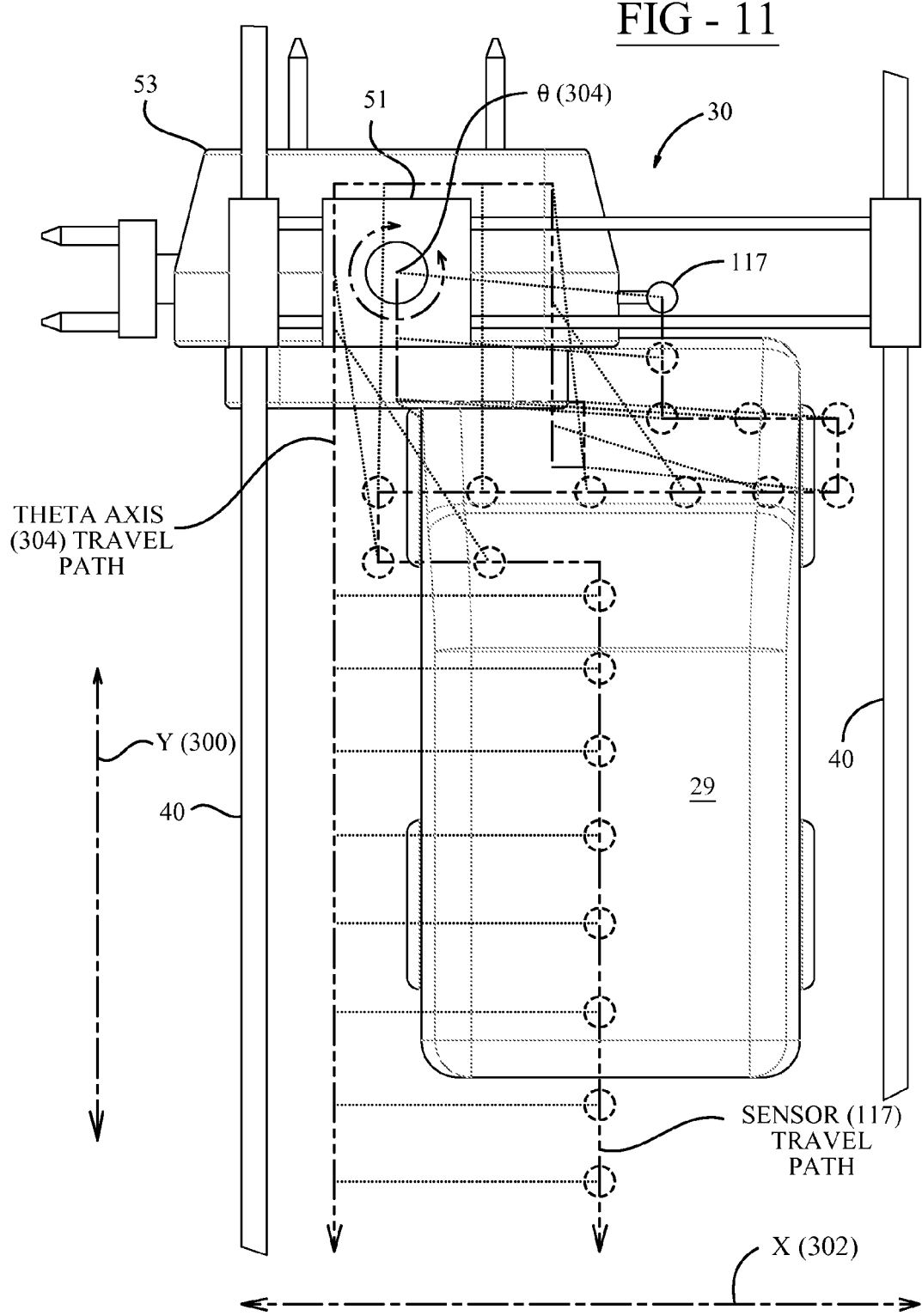
FIG. 11 is a top schematic path-of-travel diagram for one embodiment of the laser sensor during vehicle dimension scanning.
Figure 12A:
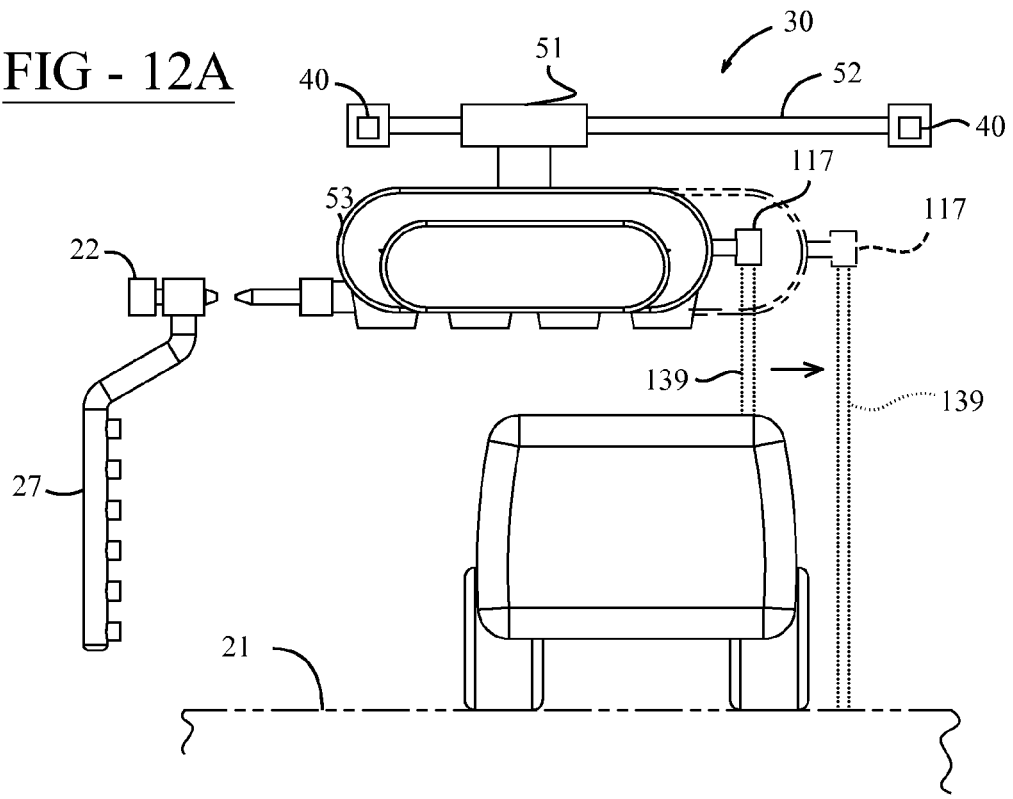
FIG. 12A is an entrance schematic view of one embodiment of the wash robot adjusting to map the side position of the vehicle.

After the vehicle is determined to be in the correct position as is shown in FIGS. 11 and 12A, the robot 30 carries out a vehicle mapping sequence to detect the sides, rear, and height of the vehicle 29 while utilizing the X, Y and Theta motion in conjunction with the laser sensor 117 mounted on the theta body 53. At the start of the mapping sequence, the robot 30 is positioned at the exit of the wash bay and then travels toward the wash bay entrance. After the laser sensor 117 detects the vehicle, the robot 30 will continue in the same path for approximately 36 inches, or within the length of the shortest length vehicle 29 that could be washed, at which point the robot shuttle 51 advances toward the passenger's side of the wash bay until the floor 21 is detected at which point the vehicle 29 passenger's side position is stored into the motion controller memory. The robot 30 then makes an X, Y, and Theta coordinated move to travel the laser sensor 117 directly across the vehicle 29 laterally until the driver's side position is detected as well, and is stored into memory. At this point in the mapping sequence the theta body is indexed approximately 90 degrees out from where it started in the sequence. Thereafter, another robot 30 X, Y, and Theta coordinated move brings the laser 117 laterally to the center of the vehicle 29 with the theta body indexed to original angular position. Then, the robot travels toward the wash bay entrance until the vehicle 29 rear end is detected and the position stored into controller memory.

Figure 12B:
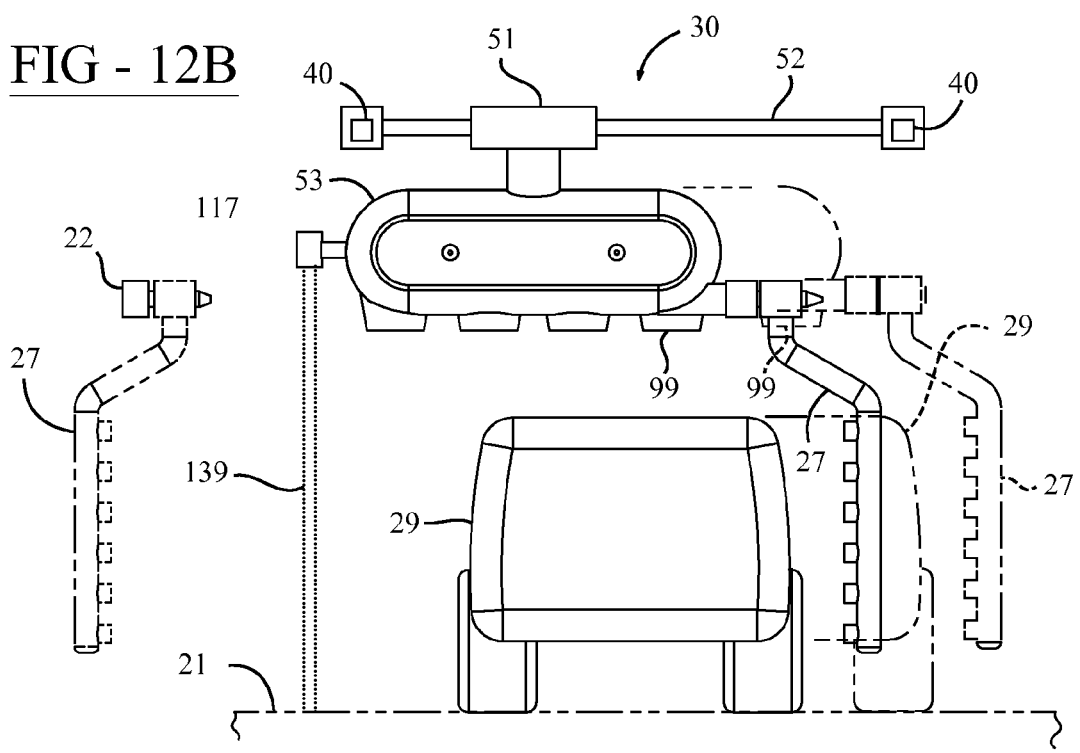
FIG. 12B is an entrance schematic view of one embodiment of the wash robot adjusting the theta body and side tools according to vehicle size or position.

FIG. 12B illustrates in schematic form how a wash tool 27 can be adjusted to the optimal washing distance away from the vehicle 29 according vehicle dimensions and parked positions in the wash bay. In this illustration the wash tool is shown in relationship to the vehicle 29 passenger's side, however, this adjustment clearly can be made to all sides of the vehicle.

Figure 13:
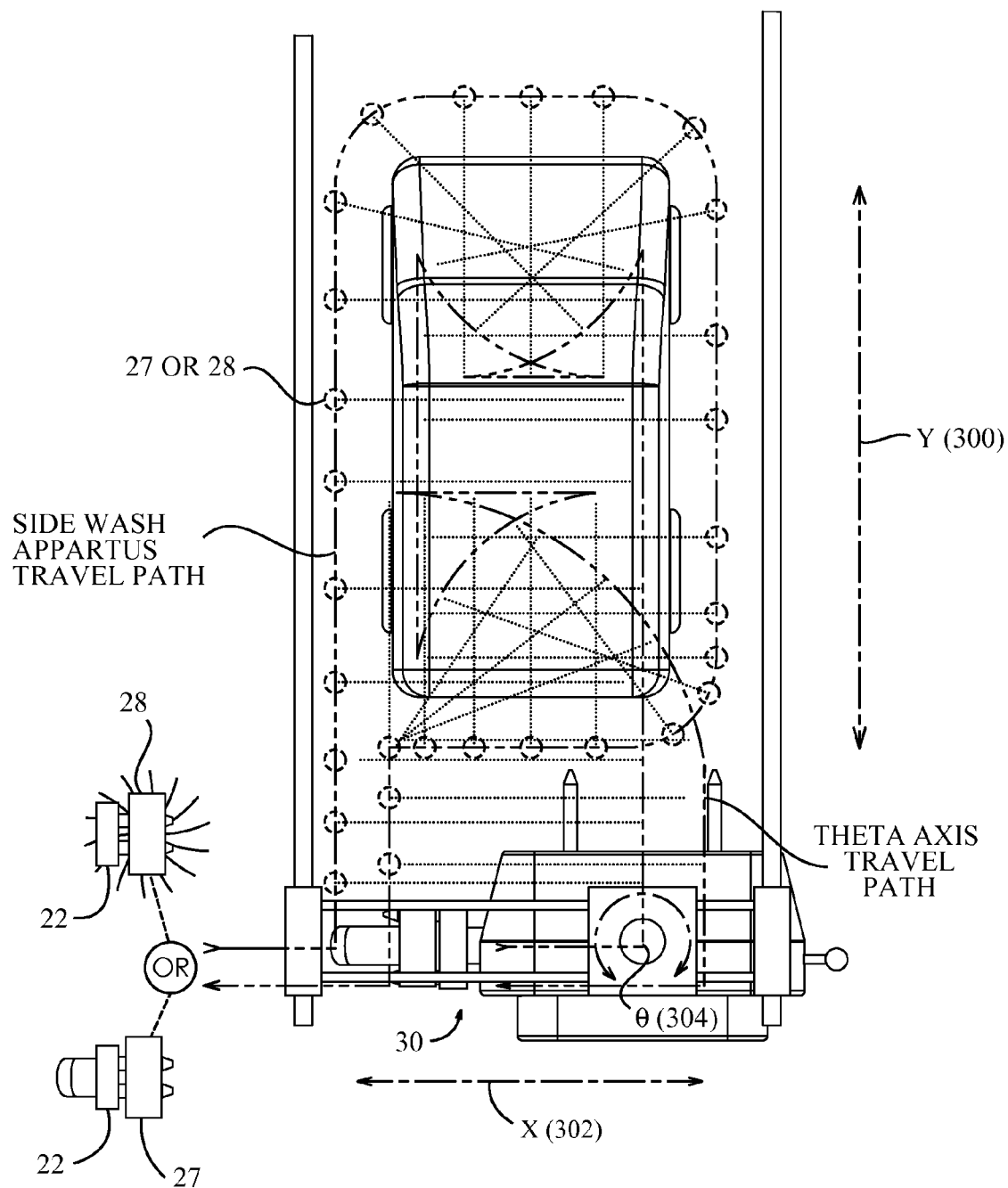
FIG. 13 is a top schematic path-of-travel diagram for one embodiment of the side wash tool and theta axis during a wash cycle.

Referring to FIG. 13, a selected side wash tool 27 or 28 is attached to the robot 30, and utilizing the X, Y, and Theta coordinated motion, the vehicle 29 can be circumscribed with a wash tool 27 or 28, while maintaining an optimal wash distance and desired wash trajectory angle the entire periphery of the vehicle 29 until the side wash tool is placed back into the appropriate docking station. This type of circumscribing path-of-travel is utilized for applying soaps to the vehicle 29, washing the vehicle with high pressure water, and while carrying out a friction wash cycle. It should be noted however, that during any of these cycles additional moves for enhanced capability may be carried out.

What is claimed is:

1. A vehicle wash system for washing a vehicle positioned within a wash area, the wash area defined by a forward boundary, a rear boundary, and a pair of side boundaries extending between the forward and rear boundaries establishing a wash area perimeter to surround the vehicle, the system comprising:
    a track system positioned above the wash area;
    a movable body coupled to and suspended from the track system above the wash area, the movable body operable between a first mode of operation and a second mode of operation;
    at least one or more wash tools selectively attachable to the movable body, wherein the one or more wash tools is attached to the movable body in the first mode of operation such that the one or more wash tools extends from the movable body into the wash area, and wherein the one or more wash tools is detached from the movable body in the second mode of operation;
    a controller configured to move the movable body over the wash area along a first axis in a longitudinal direction and rotate the movable body about a second axis perpendicular to the first axis; and
    wherein when the movable body is in the first mode of operation, the controller is configured to move the movable body along at least the first axis and rotate about the second axis such that substantial rotation of the movable body only occurs adjacent the forward or rear boundaries to position the one or more wash tools along the wash area perimeter, and when the movable body is in the second mode of operation, the controller is configured to move the movable body along the first axis and rotate about the second axis such that substantial rotation of the movable body occurs at any position between and including the forward or rear boundaries.

2. The vehicle wash system according to claim 1, wherein the controller is configured to move the movable body along a third axis in a lateral direction.

3. The vehicle wash system according to claim 1, wherein the movable body comprises a sensor for sensing a position of an automobile in or near the wash area.

4. The vehicle wash system according to claim 3, wherein the sensor is movable with the movable body to sense a forward edge of the automobile and a rear edge of an automobile.

5. The vehicle wash system according to claim 1, wherein the movable body comprises a blower for drying an automobile in or near the wash area and a motor for powering the blower.

6. The vehicle wash system according to claim 1, further comprising a first motor for moving the movable body along the first axis and a second motor for moving the movable body along the second axis.

7. The vehicle wash system according to claim 6, wherein the first and second motors are coupled to an encoder, wherein the encoder is coupled to the controller for determining the position of the movable body.

8. The vehicle wash system according to claim 1, wherein the one or more wash tools comprise one or more of a wash tool to wash a side surface of a vehicle, a spray bar to spray a liquid onto the vehicle and a blower for drying the vehicle.

9. The vehicle wash according to claim 1, further comprising a docking station to hold the one or more wash tools that are not in use.

10. A vehicle wash system, comprising:
a support system positioned above a wash area;
a controller;
a movable body coupled to and suspended from the support system above the wash area, wherein the movable body moves on the support system along at least two axes and rotates about a third axis perpendicular to the at least two axes; and
at least one stab shaft for insertion into a corresponding receptacle to selectively attach at least one or more wash tools to the movable body in a first mode of operation, wherein when the one or more wash tools is attached to the movable body, the one or more wash tools extends at least partially into the wash area as the movable body moves along the at least two axes, and when the one or more wash tools is detached from the movable body in a second mode of operation, as the movable body moves along the at least two axes, no wash tools extend from the movable body into the wash area; and
wherein when the movable body is in the first mode of operation, the controller is configured to move the movable body along at least the first axis and the second axis and rotate about the third axis such that substantial rotation of the movable body only occurs in front or behind the vehicle, and when the movable body is in the second mode of operation, the controller is configured to move the movable body along the first axis and the second axis and rotate about the third axis such that substantial rotation of the movable body occurs at any position between the front and rear of the vehicle.

11. The vehicle wash system according to claim 10, wherein the movable body further comprises a blower.

12. The vehicle wash system according to claim 10, wherein the at least one or more wash tools comprises: a first wash tool comprising a high pressure water wash tool; and a second wash tool comprising a friction wash tool.

13. The vehicle wash system according to claim 10, wherein the at least stab shaft comprises a fluid port.

14. The vehicle wash system according to claim 10, wherein the at least one stab shaft extends from the movable body.

15. A vehicle wash system for washing a vehicle positioned within a wash area, the wash area defined by a forward boundary, a rear boundary, and a pair of side boundaries extending between the forward and rear boundaries establishing a wash area perimeter to surround the vehicle, the system comprising:
a support system positioned above the wash area;
a controller;
a movable body coupled to and suspended from the support system above the wash area, wherein the movable body moves on the support system above the wash area along at least two axes in a longitudinal direction and a lateral direction;
at least one shaft for insertion into a corresponding receptacle to selectively attach at least one or more wash tools to the movable body in a first mode of operation, wherein when the one or more wash tools is attached to the movable body, the one or more wash tools extends at least partially into the wash area as the movable body moves along the at least two axes, and when the one or more wash tools is detached from the movable body in a second mode of operation, as the movable body moves along the at least two axes, no wash tools extend from the movable body into the wash area; and
wherein when the movable body is in the first mode of operation, the controller is configured to move the movable body in response to a first set of instructions, and when the movable body is in the second mode of operation, the controller is configured to move the movable body in response to a second set of instructions different from the first set of instructions.

16. The vehicle wash system according to claim 15, wherein the at least one or more wash tools comprises a first wash tool comprising a high pressure water wash tool and a second wash tool comprising a friction wash tool.

17. The vehicle wash system according to claim 15, wherein the controller is configured to rotate the movable body in response to the second set of instructions about a third axis at any position above the wash area.

18. The vehicle wash system according to claim 15, wherein the controller is configured to rotate the movable body in response to the first set of instructions only at the forward and rear boundaries.

* * * * *